US009912711B1

(12) United States Patent
Favale et al.

(10) Patent No.: US 9,912,711 B1
(45) Date of Patent: Mar. 6, 2018

(54) COMPUTER SYSTEM OF COMPUTER SERVERS AND DEDICATED COMPUTER CLIENTS CONFIGURED FOR VIDEO PLAYING WITH LIVE METADATA STREAMING BASED ON VIDEO CONTENT, AND METHODS OF USE THEREOF

(71) Applicant: Blingby, LLC, Watermill, NY (US)

(72) Inventors: Marcia Elizabeth Christian Favale, Watermill, NY (US); Robert Thomas Stanicic, Houston, TX (US)

(73) Assignee: Blingby, LLC, Watermill, NY (US)

( * ) Notice: Subject to any disclaimer, the term of this patent is extended or adjusted under 35 U.S.C. 154(b) by 0 days.

(21) Appl. No.: 15/486,133

(22) Filed: Apr. 12, 2017

Related U.S. Application Data

(60) Provisional application No. 62/321,319, filed on Apr. 12, 2016.

(51) Int. Cl.
| | |
|---|---|
| *G06F 15/16* | (2006.01) |
| *H04L 29/06* | (2006.01) |
| *G06F 3/0482* | (2013.01) |
| *G06Q 30/02* | (2012.01) |
| *H04N 21/44* | (2011.01) |
| *G06K 9/00* | (2006.01) |
| *H04N 21/81* | (2011.01) |

(Continued)

(52) U.S. Cl.
CPC ........ *H04L 65/4084* (2013.01); *G06F 3/0482* (2013.01); *G06F 17/30044* (2013.01); *G06K 9/00711* (2013.01); *G06Q 30/02* (2013.01); *G06Q 30/0251* (2013.01); *H04L 65/1063* (2013.01); *H04L 65/607* (2013.01); *H04L 67/42* (2013.01); *H04N 21/4307* (2013.01); *H04N 21/44008* (2013.01); *H04N 21/4532* (2013.01); *H04N 21/812* (2013.01)

(58) Field of Classification Search
CPC .......... G06F 17/30044; G06K 9/00711; G06Q 30/02; G06Q 30/0251; H04N 21/4307; H04N 21/44008; H04N 21/4532; H04N 21/4725; H04N 21/812
See application file for complete search history.

(56) References Cited

U.S. PATENT DOCUMENTS

| | | | |
|---|---|---|---|
| 2004/0019608 A1* | 1/2004 | Obrador | ............ G06F 17/30044 |
| 2009/0006191 A1* | 1/2009 | Arankalle | .............. G06Q 30/02 |
| | | | 705/14.71 |

(Continued)

*Primary Examiner* — David Lazaro
(74) *Attorney, Agent, or Firm* — Greenberg Traurig, LLP

(57) ABSTRACT

In some embodiments, the present invention provides for a computer system, including at least: a GUI client; a dedicated application server; where the dedicated application server is configured to operationally connect to the GUI client; where the dedicated application server is associated with a metadata item database, including metadata related to plurality of items; where the GUI client is configured to generate a GUI that includes: a video player area and a plurality of metadata areas that are configured to display, in real-time, streamed metadata items that are related to content of the video streamed by the video player at a particular playing time to form a metadata stream; initiate the streaming of the video; determine the plurality of streamed metadata items related to the content of the video; and causing to display at the plurality of metadata areas, via a visual pattern, the plurality of streamed metadata items.

24 Claims, 36 Drawing Sheets

(51) Int. Cl.
*H04N 21/43* (2011.01)
*G06F 17/30* (2006.01)
*H04N 21/45* (2011.01)

(56) References Cited

U.S. PATENT DOCUMENTS

| | | | | |
|---|---|---|---|---|
| 2010/0123830 A1* | 5/2010 | Vunic | ................ | G06K 9/00711 |
| | | | | 348/700 |
| 2012/0177067 A1* | 7/2012 | Cho | .................... | H04N 21/4126 |
| | | | | 370/503 |
| 2015/0169960 A1* | 6/2015 | Laksono | .............. | G06K 9/4652 |
| | | | | 382/170 |
| 2016/0148650 A1* | 5/2016 | Laksono | ............. | G11B 27/309 |
| | | | | 386/230 |

\* cited by examiner

| Table | Table description | Field_name | Field Description | Dependent tables | Reference tables |
|---|---|---|---|---|---|
| Location | Table holds information about a location i.e. city, state, country | Location_id | Primary Key | User Profile Item Media User Click History User Transaction History | |
| | | Location_description | Text description of location | | |
| | | Location_code | Code that identifies geographic position of a location. | | |
| Audio | Table holds information on Audio fingerprints that are used to identify audio tracks using audio recognition feature. | Audio_track_id | Primary Key | Media | |
| | | Audio_track_description | Text description of audio track | | |
| | | Audio_track_fingerprint | Digital fingerprint of audio track used for audio recognition matching | | |

FIG. 3B

| Table | Table description | Field_name | Field Description | Dependent tables | Reference tables |
|---|---|---|---|---|---|
| Product | Table holds specific information about a product, destination, real estate, charity, person website & social media etc. | Product_id | Primary Key | Affiliate Item Purchases | |
| | | Product_title | Text product title | | |
| | | Product_description | Text description of product | | |
| | | Target_user_location_id | The location id associated with the product to be associated with person and user locations for geo tracking. | | Location |
| | | Target_user_gender | Gender description used to associate users with persons, videos, products and destinations. | | |
| | | Target_user_age | Age range used to associate users with persons, videos, products and destinations. | | |
| | | Target_user_interest | Text description of user interest groups used to associate users with persons, videos, products and destinations. | | |
| | | Product_image_file | Image file of the product or service that is displayed on web and mobile platforms | | |
| | | Product_class | Meta category for products that include product, travel, real estate etc. that is used for content filtering as well as associating users with persons, videos, products and destinations. | | |
| | | Product_type | Sub category for products that include Apparel, Shoes, Sunglasses etc. that is used for content filtering as well as associating users with persons, videos, products and destinations. | | |
| | | Affiliate_id | Primary of affiliate associated with product | | Affiliate |
| | | Product_url | The affiliate merchant's internet address displayed on web and mobile platforms for the product or service to be purchased by the user. | | |

FIG. 3C

| Table | Table description | Field_name | Field Description | Dependent tables | Reference tables |
|---|---|---|---|---|---|
| Affiliate | Table holds information on affiliates merchants or organizations that trade products or services. | Affiliate_id | Primary key | Brand | |
| | | Affiliate_name | Text description of affiliate merchant or organization | | |
| | | Product_id(s) | The primary key of products that are associated with the affiliate | | Product |
| Brand | Table holds information about a brand that is associated with an affiliate or number of affiliates. A person can also be a brand | Brand_id | Primary key | Person | |
| | | Brand Name | Text description of brand name | | |
| | | Affiliate_id(s) | The primary keys of affiliates associated with the brand | | Affiliate |
| Person | Table holds information about a person of interest in video i.e. musician, artist, actor, celebrity, government official, company etc. | Person_id | Primary key | User profile Item Media User transaction history | |
| | | Person_image_file | Image file of the person displayed on web and mobile platforms | | |
| | | Person_description | Text description of the person displayed on web and mobile platforms | | |
| | | Person_genre | The genre associated with the person i.e. government, pop music, fashion etc. that is used for content filtering as well as associating users with persons. | | |
| | | Brand_id(s) | The primary keys of brands associated with the person | | |

FIG. 3D

| Table | Table description | Field_name | Field Description | Dependent tables | Reference tables |
|---|---|---|---|---|---|
| User | Table holds information about a user and user preferences | User_id | Primary key | User click history User transaction history | |
| | | Username | Users short name assigned when the user account is created and used when logging back into the system | | |
| | | Contact_details | Email address, phone number | | |
| | | Date_of_birth | Date of birth used to verify legality of user on system. | | |
| | | Location_id | Primary key of location table that is used to that is used when associating users with persons, videos, products and destinations. | | Location |
| | | Bio_text | Text description of user bio displayed on user profile page | | |
| | | User_image_file | Image file of user that displays on user profile page | | |
| | | Interests | Text description of interests i.e. music, fashion, sport etc. | | |
| | | Person_id(s) | Primary key of persons that the user follows to view latest videos, products and destinations associated with the person | | Person |

FIG. 3E

| Table | Table description | Field_name | Field Description | Dependent tables | Reference tables |
|---|---|---|---|---|---|
| Item | Table holds information on a product or group of alternative products that appear in video, with attributes that relate the item to the video where and when the product or group of products appear. | Item_id | Primary key | Media | |
| | | Item_title | Text title of item used to describe the context of item placement in video | | |
| | | Timestamp | The timestamp associated with the item appearing in the video | | |
| | | Shop_page_layout | Identifies the shop page layout to be displayed on web and mobile based on item type i.e. product, travel, real estate | | |
| | | Product_id(s) | Primary key of product(s) that are associated with the item. This includes primary product and alternative products. | | Product |
| | | Person_id(s) | Primary key of person(s) associated with the item. This is used for content filtering as well as associating persons with videos, products and destinations. | | Person |
| | | Location_id(s) | Primary key of location(s) associated with the item. This is used for content filtering as well as associating persons with videos, products and destinations. | | Location |

FIG. 3F

| Table | Table description | Field_name | Field Description | Dependent tables | Reference tables |
|---|---|---|---|---|---|
| Media | Table holds information about the attributes of a video that is featured on the video page. | Media_id | Primary key | Live Item Push User transaction history | |
| | | Media_format | Identifies the source of the video -- native, native live, third party native, third party native live etc. This is used to trigger the use of different video players on the web and mobile platform. | | |
| | | Person_id(s) | Primary key of persons associated with the video. This is used for content filtering as well as associating persons with videos. | | Person |
| | | Location_id(s) | Primary key of location(s) associated with the video. This is used for content filtering as well as associating locations with videos. | | Location |
| | | Item_id(s) | Primary key of items to be displayed in the video. | | Item |
| | | Audio_track_id(s) | The primary key of audio track id(s) used in video to be used during audio recognition search and return of videos containing the audio track. | | Audio |
| | | Media_title | Text title of video used in display on web and mobile platform. | | |
| | | Media_genre | The genre associated with the video i.e. government, pop music, fashion etc. that is used for content filtering as well as associating users with persons. | | |
| | | Media_year | The year the video was created and used in the display on web and mobile platform. | | |
| | | Media_length | The length of the video in seconds. This is used as a marker for timestamp synchronization. | | |
| | | Media_image_file | The thumbnail image of the video that is displayed on web and mobile platform. | | |

FIG. 3G

| Table | Table description | Field_name | Field Description | Dependent tables | Reference tables |
|---|---|---|---|---|---|
| Live item push | Table holds information about when a product is being pushed live. | Push_id | Primary key | | |
| | | Media_id | The primary key of the video media associated with the live item push. This is used for live streaming of items during a live video stream. | | Media |
| | | Product_id | The primary key of the product being pushed during live video stream. | | Product |
| Purchases | Table holds information about purchase history of products. | Purchase_id | Primary key | User transaction history | |
| | | Product_id | Primary key of product associated with the purchase | | Product |
| | | Purchase_details | Purchase details include date, quantity, price. | | |
| User click history | Table holds information about the interactions a user has with the website or mobile app. | User_id | Primary key of user | | User |
| | | Click_event | An event is a user click on a particular object on the web and mobile platform. This includes clicks on videos, products, destinations. | | |
| | | Location_id | The primary key of the location associated with the user click event | | Location |
| User transaction history | Table holds information that associates the user with purchase transaction history. | User_id | Primary key of user | | User |
| | | Purchase_id | Primary key of purchase transaction | | Purchases |
| | | Media_id | Primary key of video | | Media |
| | | Location_id | Primary key of location of transaction | | Location |

FIG. 3H

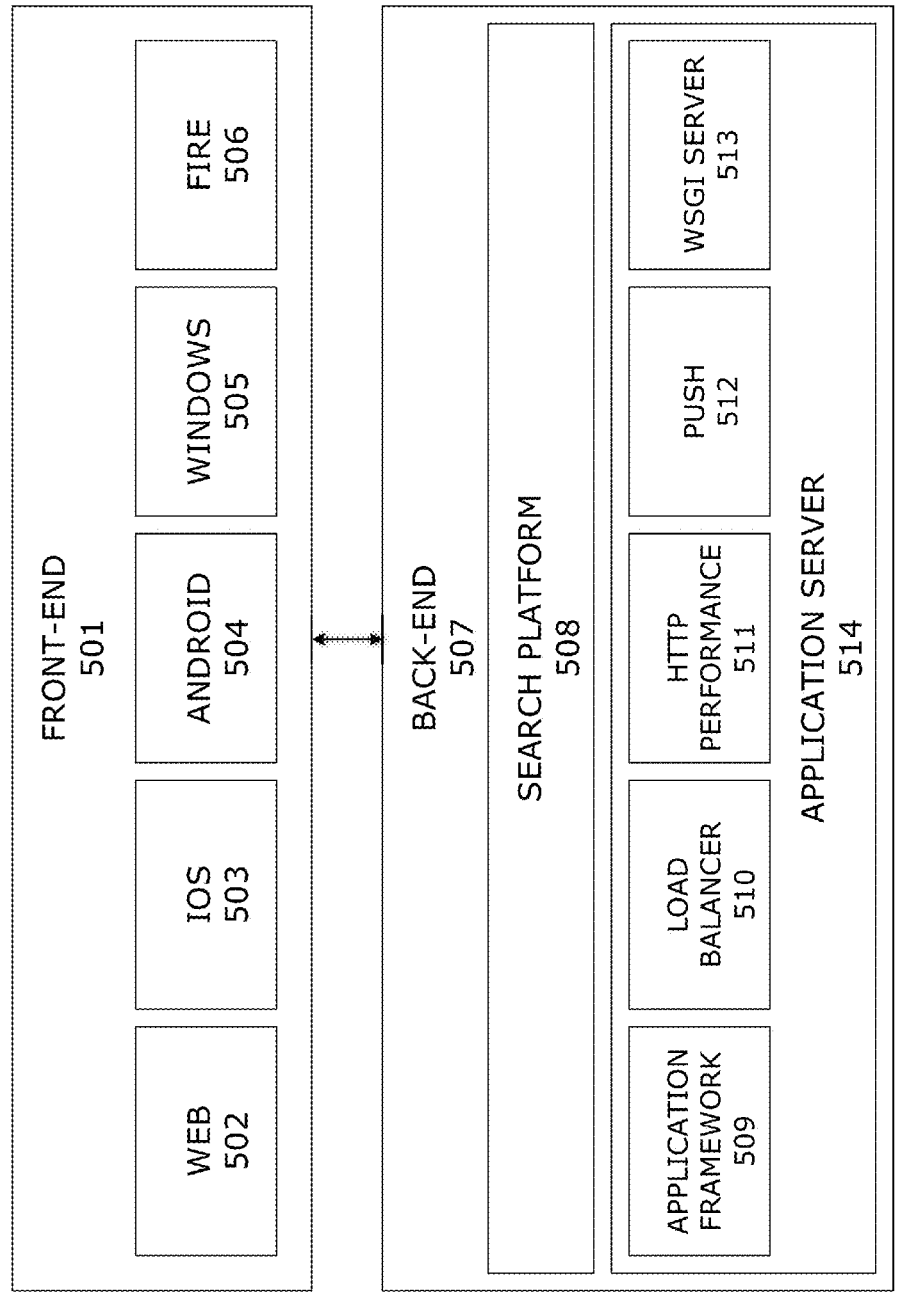

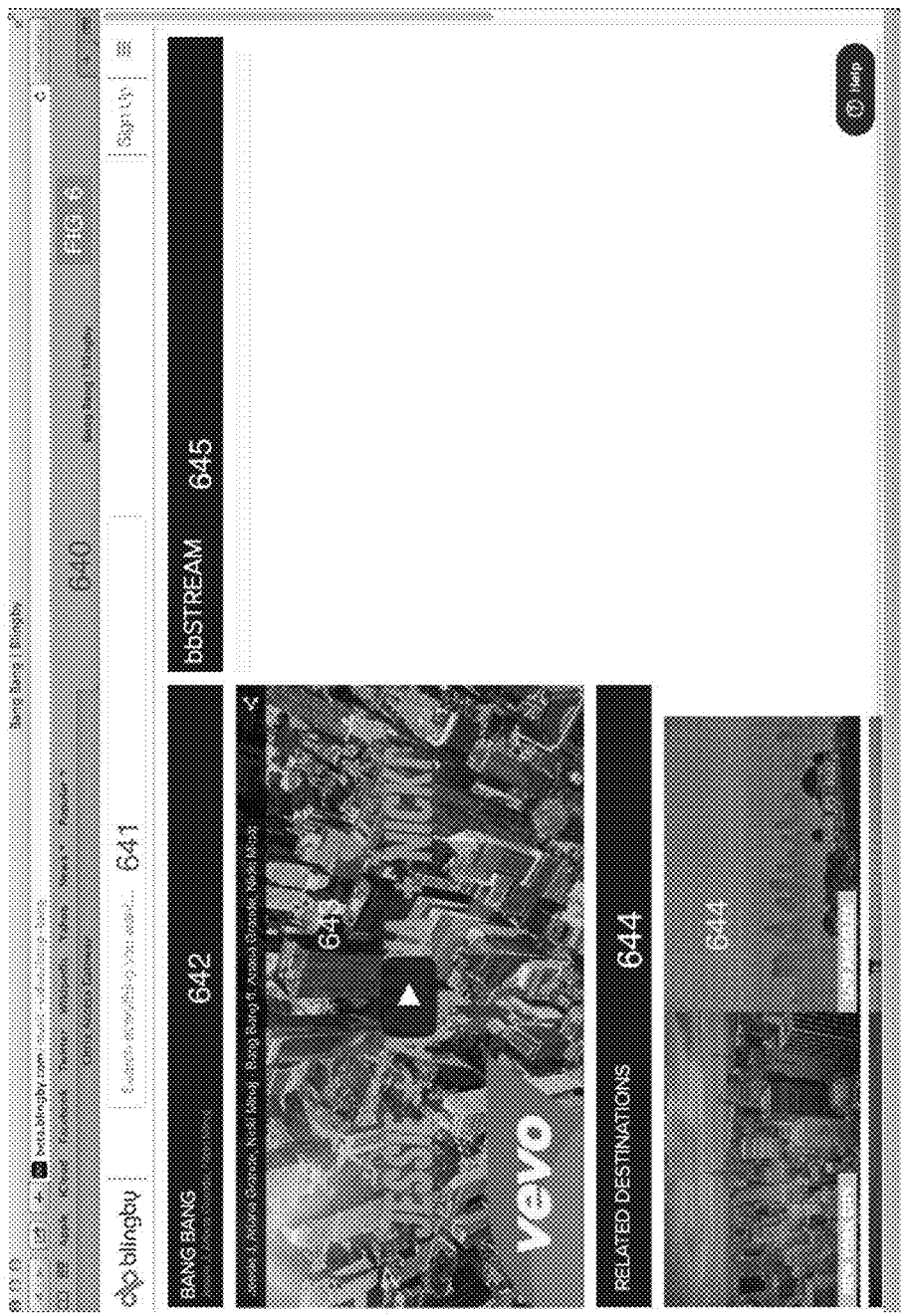

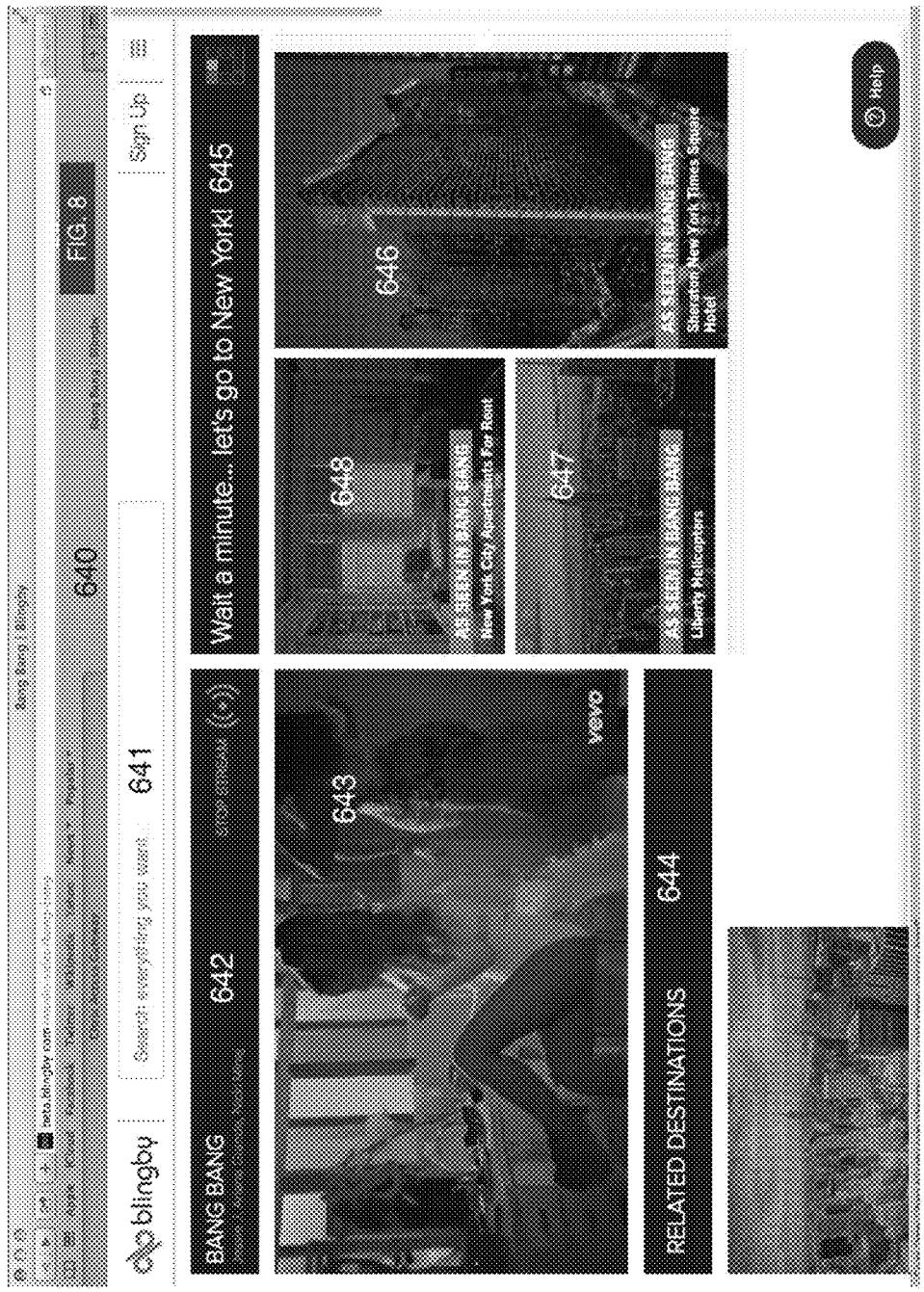

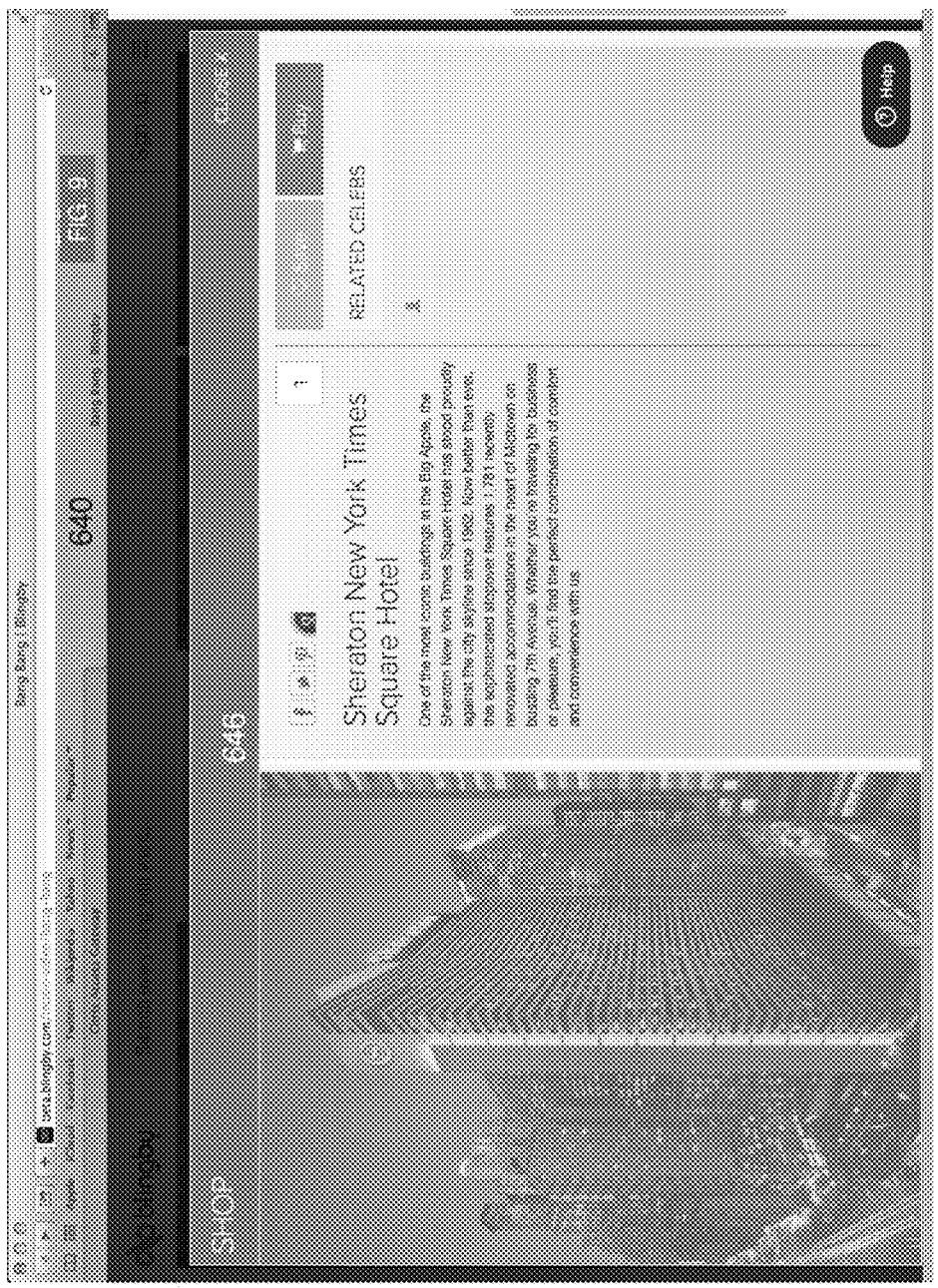

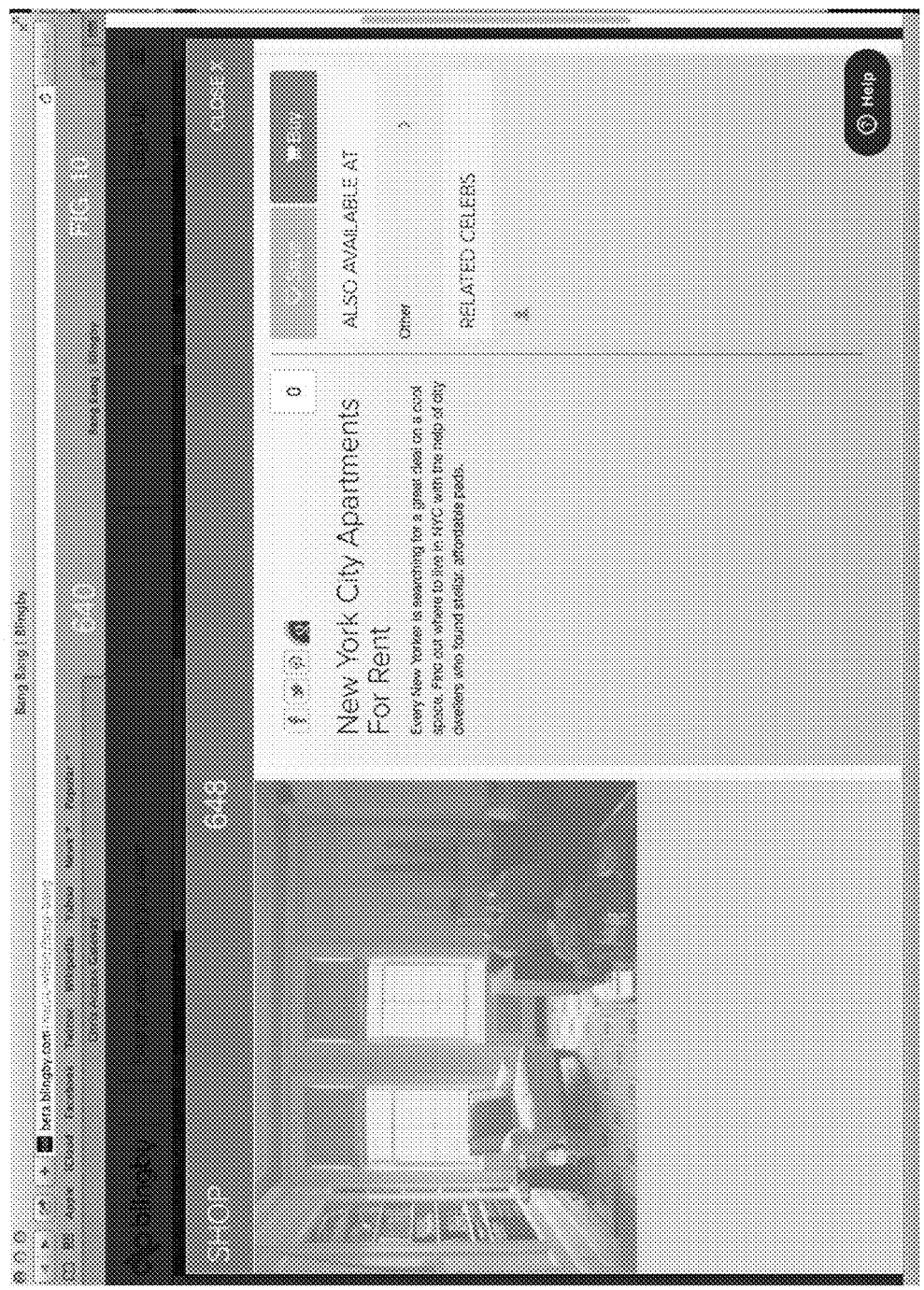

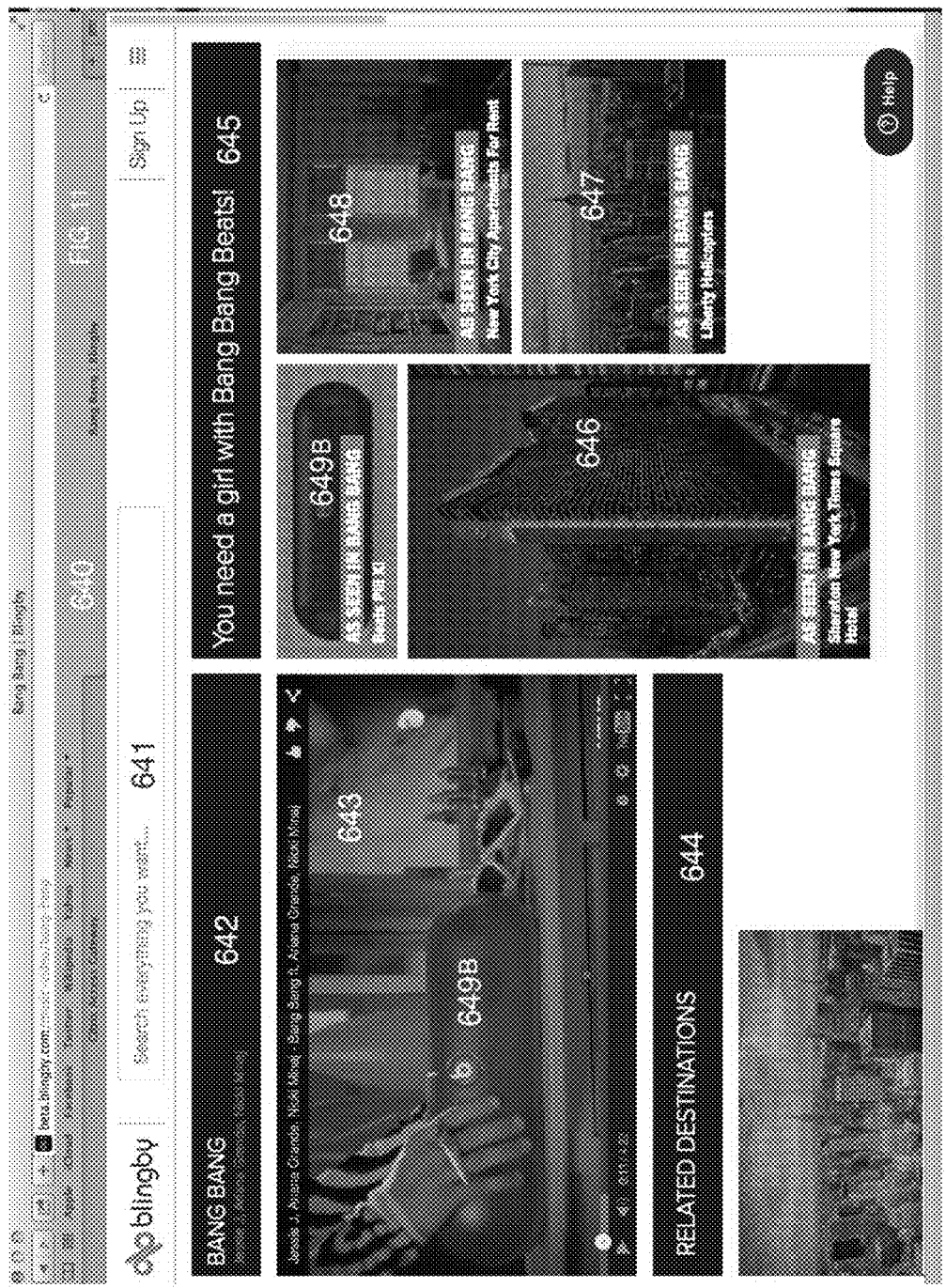

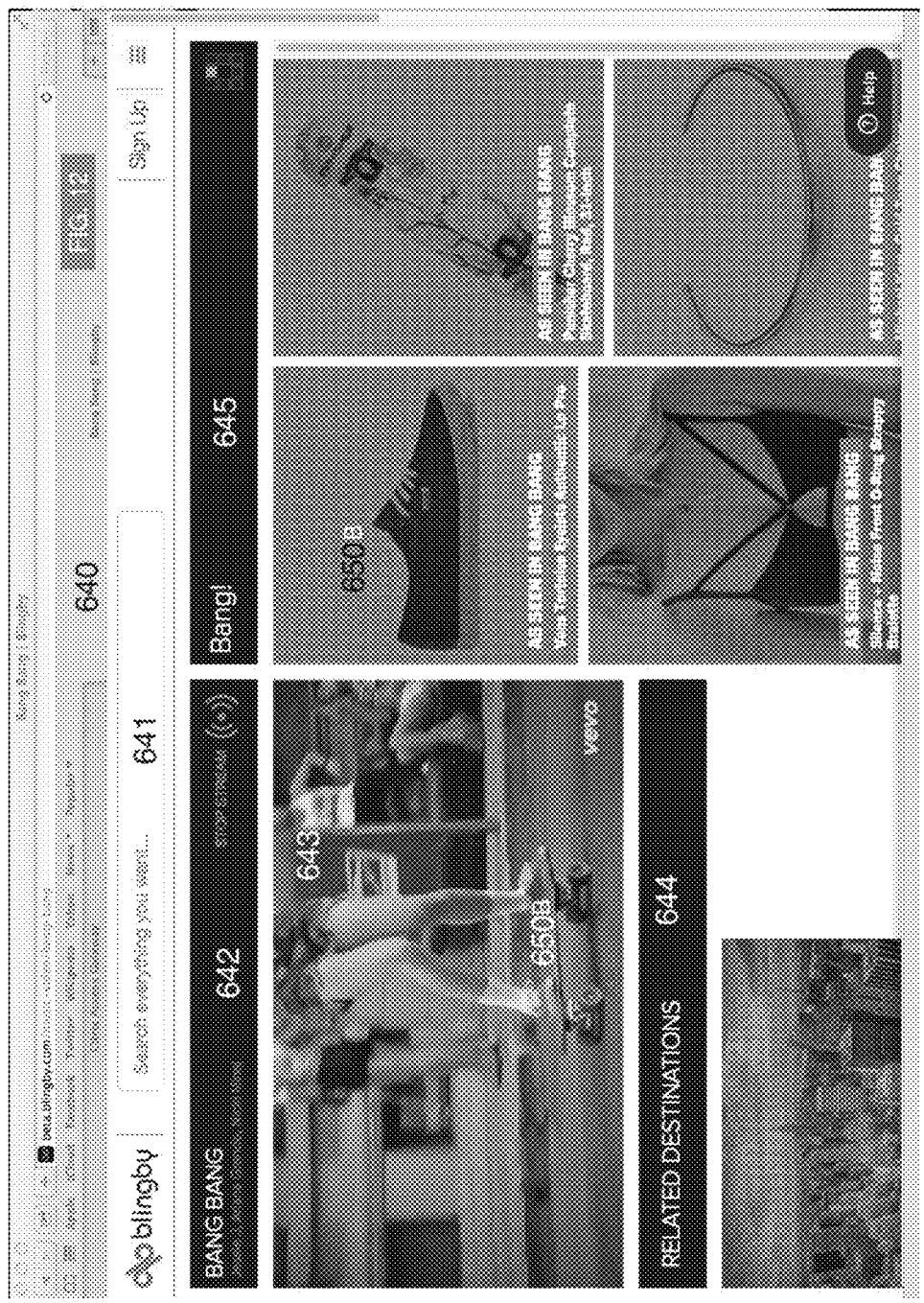

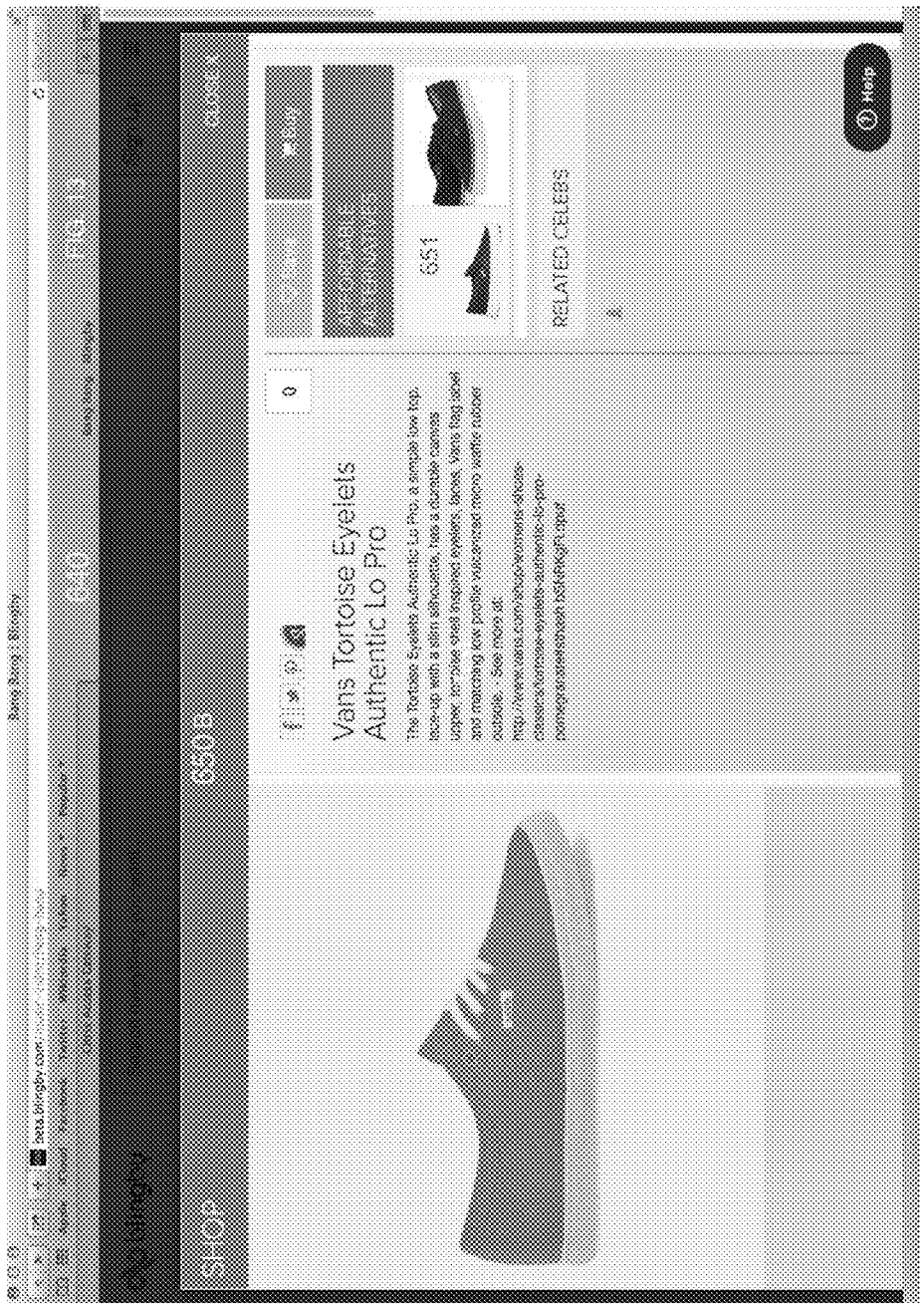

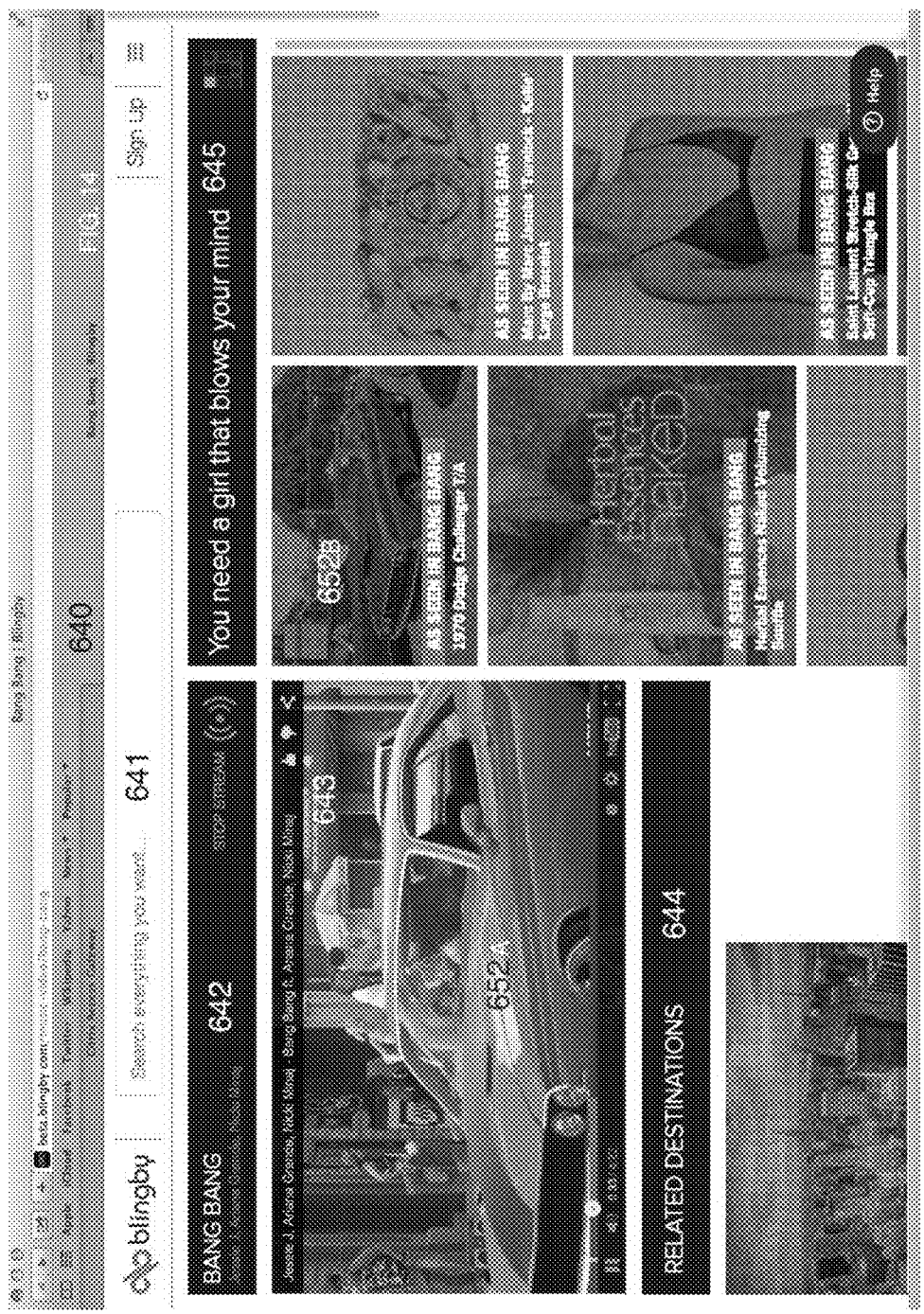

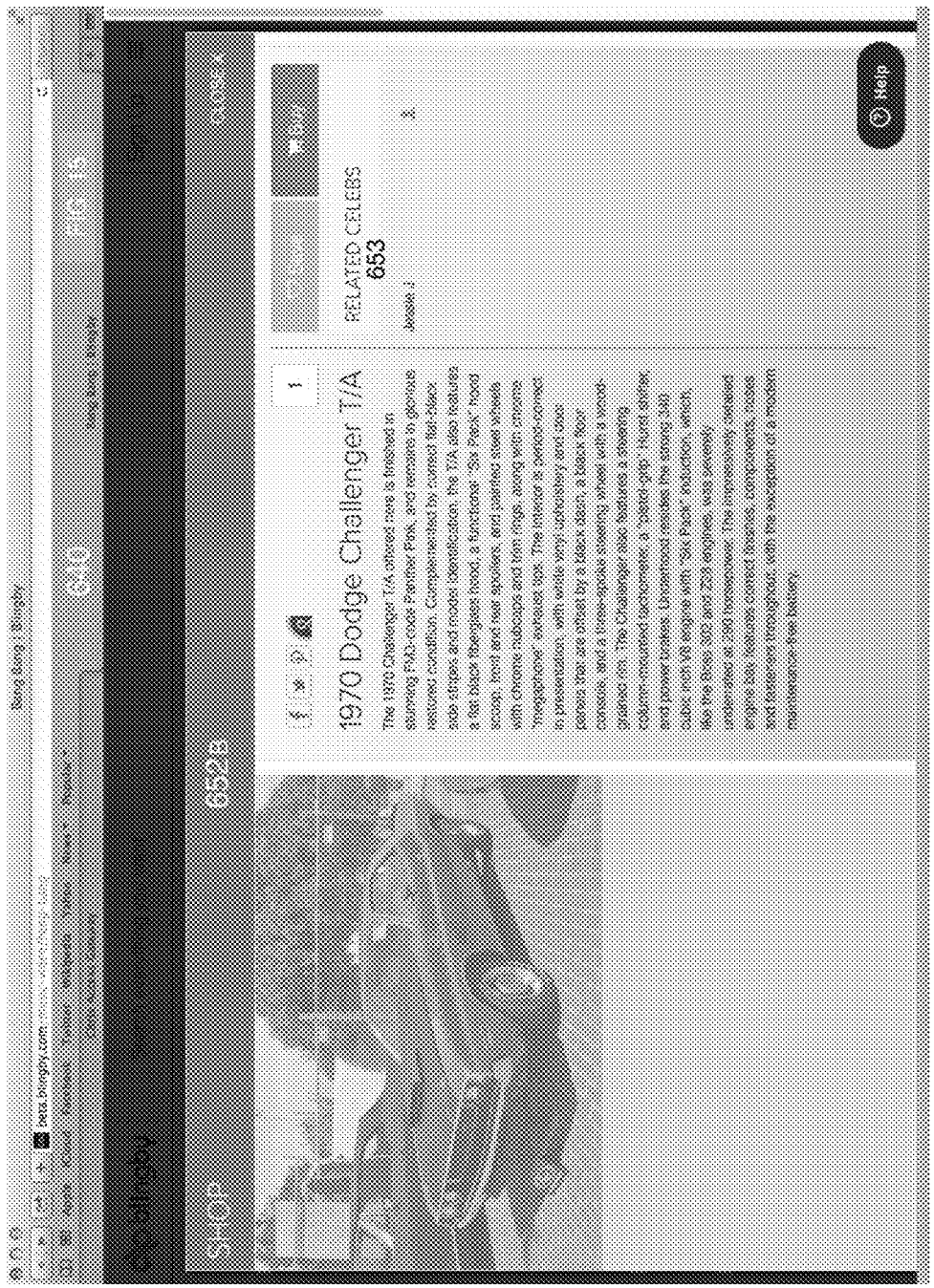

COMPUTER SYSTEM OF COMPUTER SERVERS AND DEDICATED COMPUTER CLIENTS CONFIGURED FOR VIDEO PLAYING WITH LIVE METADATA STREAMING BASED ON VIDEO CONTENT, AND METHODS OF USE THEREOF

RELATED APPLICATIONS

This application claims the priority of U.S. Provisional Appln. No. 62/321,319, filed Apr. 12, 2016, entitled "SYSTEM OF TIME-CODED VIDEO STREAMING AND SYNCHRONISE PLAYBACK OF VIDEO METADATA FOR PATTERN RECOGNITION," which is incorporated herein by reference in its entirety for all purposes.

FIELD OF TECHNOLOGY

The subject matter herein generally relates computer servers configured for time-coded video streaming, specifically, synchronization of life video playback and video metadata based on pattern recognition.

SUMMARY OF THE INVENTION

In some embodiments, the present invention provides for an exemplary computer system which includes at least the following components: at least one graphical user interface client; at least one dedicated application server; where the at least one dedicated application server includes a non-transitory memory storing instructions and at least one server processor; where, when executing the instructions by the at least one server processor, the at least one dedicated application server is configured to operationally connect to the at least one graphical user interface client; where the at least one dedicated application server is associated with at least one metadata item database, including metadata related to plurality of items; where the at least one graphical user interface client is configured to utilize at least one processor of a computing device of a user to: generate at least one graphical user interface that includes: at least one video player area that is configured to display at least one video player, and a plurality of metadata areas that are configured to display, in real-time, streamed metadata items that are related to at least a portion of content of at least one video streamed by the at least one video player at a particular playing time to form a metadata stream; receive, from the user, a request to stream a video; initiate the streaming of the video; for at least one portion of content of the video being streamed by the at least one video player: determine the plurality of streamed metadata items related to the at least one portion of the content of the video, based on at least one of: 1) determining at least one time coding flag being associated with the at least one portion of the content of the video and transmitting the at least one time coding flag to the at least one dedicated application server, where the at least one dedicated application server is configured to query the at least one metadata item database to identify a first plurality of streamed metadata items related to at least one first item of the plurality of items and return the first plurality of streamed metadata items the at least one graphical user interface client; 2) causing the at least one portion of the content to evaluated by a visual recognition algorithm; where the visual recognition algorithm is at least configured to: identify at least one video content item present in the at least one portion of the content of the video at the particular playing time, match the at least one video content item to at least one second item of the plurality of items whose metadata is stored in the at least one metadata item database, and return a second plurality of streamed metadata items corresponding to the at least one second item to at least one graphical user interface client; and 3) causing to display at the plurality of metadata areas, via a particular visual pattern, one of: i) the first plurality of streamed metadata items, ii) the second plurality of streamed metadata items, and iii) any combination of at least one first streamed metadata item of the first plurality of streamed metadata items and at least one second streamed metadata item of the second plurality of streamed metadata items.

In some embodiments, at least one metadata area of the plurality of metadata areas is configured to be adjacent to the at least one video player area In some embodiments, at least one metadata area of the plurality of metadata areas is configured to overlay the at least one video player area.

In some embodiments, each item is one of a product, a service, or a combination of both.

In some embodiments, the at least one video content item is an individual.

In some embodiments, the at least one graphical user interface client is further configured to utilize the at least one processor of the computing device of the user to: utilize a video identifier of the video to electronically query the at least one dedicated application server to obtain a time coding sequence associated with the video, and playback the time coding sequence in parallel with the streaming of the video to determine the at least one time coding flag being associated with the at least one portion of the content of the video.

In some embodiments, the at least one graphical user interface client is further configured to synchronize the particular visual pattern of the metadata stream with the streaming of the video by the at least one video player.

In some embodiments, the particular visual pattern is independent from the streaming of the video by the at least one video player.

In some embodiments, the visual recognition algorithm is configured to match the at least one video content item to the at least one second item of the plurality of items by utilizing at least one appearance-based algorithm.

In some embodiments, the at least one appearance-based algorithm is selected from the group consisting of: edge matching algorithm, divide-and-conquer search algorithm, grey scale matching algorithm, gradient matching algorithm, large model-bases algorithm, and any combination thereof.

In some embodiments, the visual recognition algorithm is configured to match the at least one video content item to the at least one second item of the plurality of items by: identifying at least one feature of the at least one video content item, and utilizing at least one feature-based algorithm to match, based on at least one feature of the at least one video content item, the at least one video content item to the at least one second item of the plurality of items whose metadata is stored in the at least one metadata item database.

In some embodiments, the at least one feature-based algorithm is selected from the group consisting of: interpretation trees algorithm, hypothesize and test algorithm, pose consistency and clustering algorithm, invariance algorithm, geometric hashing algorithm, scale-invariant feature transform (SIFT) algorithm, Speeded Up Robust Features (SURF) algorithm, and any combination thereof.

In some embodiments, the present invention provides for an exemplary inventive method that includes at least the following steps: generating, by at least one graphical user interface client, least one graphical user interface that includes: at least one video player area that is configured to display at least one video player, and a plurality of metadata areas that are configured to display, in real-time, streamed metadata items that are related to at least a portion of content of at least one video streamed by the at least one video player at a particular playing time to form a metadata stream; where the at least one graphical user interface client is configured to operationally connect to at least one dedicated application server; where the at least one dedicated application server includes: a non-transitory memory storing instructions and at least one server processor; where, when executing the instructions by the at least one server processor, the at least one dedicated application server is configured to operationally connect to the at least one graphical user interface client; where the at least one dedicated application server is associated with at least one metadata item database, including metadata related to plurality of items; receiving, by the at least one graphical user interface client, from the user, a request to stream a video; initiating, by the at least one graphical user interface client, the streaming of the video; for at least one portion of content of the video being streamed by the at least one video player: determining, by the at least one graphical user interface client, the plurality of streamed metadata items related to the at least one portion of the content of the video, based on at least one of: 1) determining at least one time coding flag being associated with the at least one portion of the content of the video and transmitting the at least one time coding flag to the at least one dedicated application server, where the at least one dedicated application server is configured to query the at least one metadata item database to identify a first plurality of streamed metadata items related to at least one first item of the plurality of items and return the first plurality of streamed metadata items the at least one graphical user interface client; 2) causing the at least one portion of the content to evaluated by a visual recognition algorithm; where the visual recognition algorithm is at least configured to: identify at least one video content item present in the at least one portion of the content of the video at the particular playing time, match the at least one video content item to at least one second item of the plurality of items whose metadata is stored in the at least one metadata item database, and return a second plurality of streamed metadata items corresponding to the at least one second item to at least one graphical user interface client; and 3) causing to display at the plurality of metadata areas, via a particular visual pattern, one of: i) the first plurality of streamed metadata items, ii) the second plurality of streamed metadata items, and iii) any combination of at least one first streamed metadata item of the first plurality of streamed metadata items and at least one second streamed metadata item of the second plurality of streamed metadata items.

BRIEF DESCRIPTION OF THE DRAWINGS

In order to describe the manner in which the features of the disclosure can be obtained, a more particular description of the principles briefly described above will be rendered by reference to specific examples thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 3A-3H are exemplary block diagrams of exemplary data architectures and their corresponding data definitions in accordance with at least some embodiments of the present invention;

FIGS. 5A-5B are exemplary block diagrams of an example system architecture in accordance with at least some embodiments of the present invention;

FIGS. 6-16 show various illustrative examples of some aspects of the client interface of example video services in accordance with at least some embodiments of the present invention;

DETAILED DESCRIPTION

Figure 1:
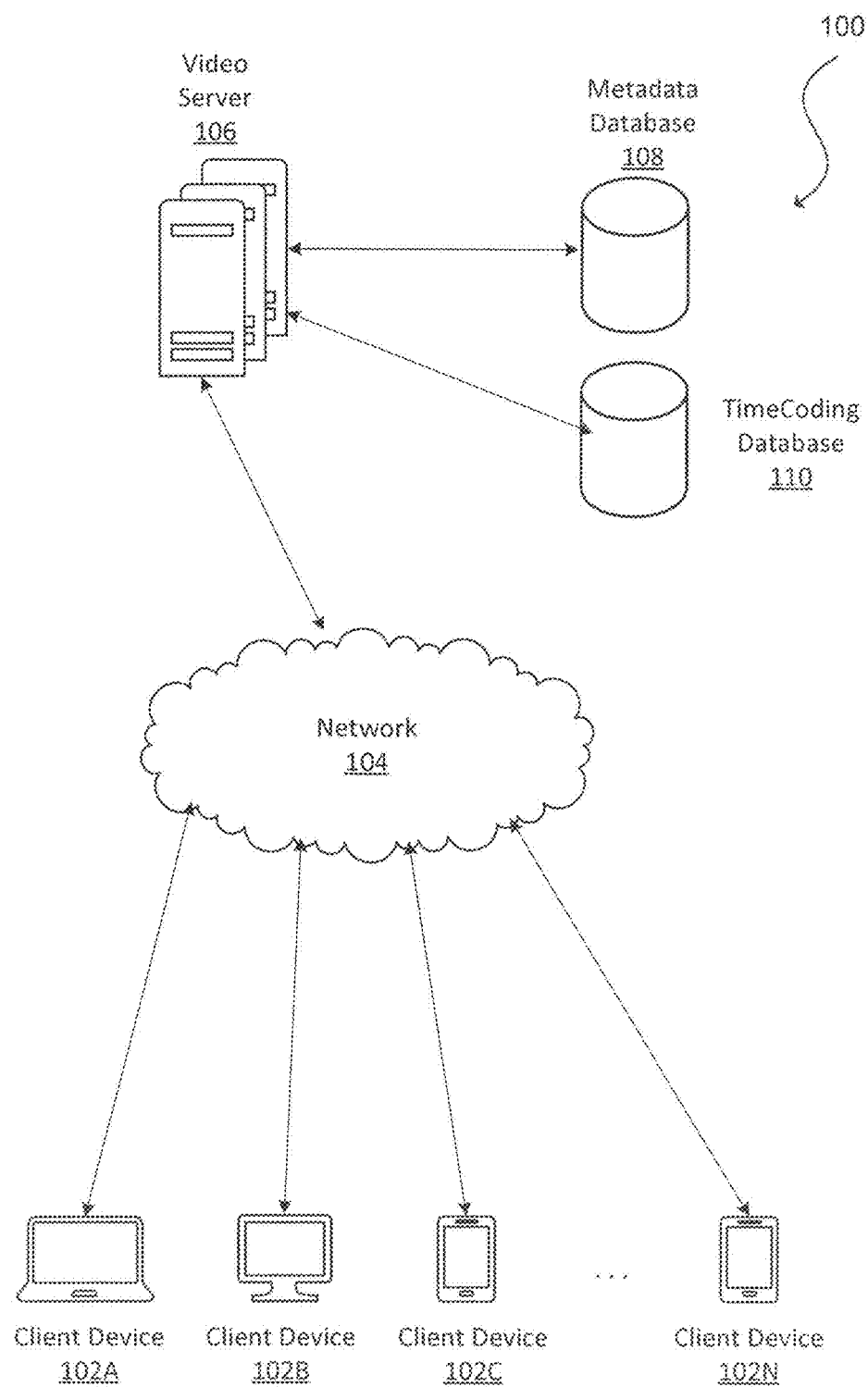
FIG. 1 is a block diagram of system for organizing and displaying metadata stream in accordance with at least some embodiments of the present invention.

Several definitions that apply throughout this disclosure will now be presented. The term coupled is defined as directly or indirectly connected to one or more components. The term server can include a hardware server, a virtual machine, and a software server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The description is not to be considered as limiting the scope of the embodiments described herein.

Various examples of the disclosure are discussed in detail below. While specific implementations are discussed, it should be understood that this is done for illustration purposes only. A person skilled in the relevant art will recognize that other components and configurations may be used without parting from the scope of the disclosure.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly through intervening components, is not necessarily limited to a physical connection, and allows for the transfer of data.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosure can implement a pattern recognition algorithm to provide information regarding corresponding or associated with video playback. The disclosure improves the speed and accuracy of pattern recognition, through the use of a side-by-side synchronous display of a still image or video with separate images moving in a time-sensitive patterned motion related to the items (e.g., metadata) appearing in the associated still image or video. The disclosure captures data relating to the items presented within a still image or video. This includes the items visual and functional description, physical composition and traits, position within the still picture or video, geographic location, etc. The disclosure can also capture data related to users interaction and reaction to associated items being presented while the still image or video is being displayed. The datasets can be referenced to predict the effectiveness of particular still picture, video, items and image combinations with pattern recognition, recall, and stimuli.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

It is understood that at least one aspect/functionality of various embodiments described herein can be performed in real-time and/or dynamically. As used herein, the terms "real-time" "live" interchangeably describe an event/action that may occur instantaneously or almost instantaneously in time when another event/action has occurred. In some embodiments, the terms "live," "instantaneous," "instantaneously," "instantly," and "in real-time" refer to a request-response pair where a time difference between a first time when a search request is transmitted and a second time when a response to the request is received is no more than 1 second. In some embodiments, the time difference between the request and the response is between less than 1 second and several seconds (e.g., 1-30 seconds).

As used herein, the term "dynamic(ly)" means that events and/or actions can be triggered and/or occur without any human intervention.

With respect to implementing various examples of the disclosed technology, an example video and metadata streaming system 100 is shown in FIG. 1, where electronic devices communicate by a network for the purposes of exchanging content and other data. The system can be configured for use on a wide area network (i.e., the Internet), as illustrated in FIG. 1. However, the present principles are applicable to a wide variety of network configurations that facilitate the intercommunication of electronic devices. For example, each of the components of system 100 of FIG. 1 can be implemented in a localized or distributed fashion in a network.

In video and metadata streaming system 100, a user can interact with video server 106 through client devices 102A, 102B, 102C, . . . , 102N (collectively "102") connected to network 104 by direct and/or indirect communication. Video server 106 can include a single and/or multiple interconnected servers. Video server 106 can support connections from a variety of different client devices 102, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, video server 106 can concurrently accept connections from and interact with multiple client devices 102.

A user can connect to a video server 106 through network 104 by a client interface installed on client device 102. For example, the client interface can be a stand-alone application, one or more application plug-ins, and/or a browser extension. However, the user can also interact with video server 106 by a third-party application, such as a web browser, that resides on client device 102. In either example, the client interface can present a client interface (UI) for the user to interact with video server 106. Client device 102 can receive input from the user and output information to the user through the client interface. For example, input can be letters, numbers, symbols, characters, or drawings. The input can be received through an input device (e.g., a camera, a touch screen, a mouse and/or keyboard, etc.) The output can be received at client device 102 through a network interface and displayed by the client interface.

Video server 106 can enable a user to stream videos from a variety of third-party services (e.g., Vimeo, YouTube, Amazon, etc.). Video server 106 can also host a plurality of videos to be streamed displayed on the client interface of client devices 102. Video server 106 can include a time coding to accompany the streaming video (as shown in FIG. 2).

To facilitate the various video services, a user can create an account (e.g., user profile) with video server 106. A user profile can include personal information related to the user. Personal information can include date of birth, age, nationality, music preferences, video preferences, payment information, etc. The user profiles can be stored in a database communicatively coupled to video server 106 (e.g., metadata database 108, time coding database 110, etc.).

Metadata database 108 can be communicatively coupled to video server 106 and can be configured to store metadata items and unique identifiers of the metadata items. The metadata database can also store associated video identifiers corresponding to metadata items and unique identifiers. Time coding database 110 can store time codings, unique identifiers of the time codings, unique identifiers to corresponding metadata items, and video identifiers. In some embodiments, the metadata database 108 and time coding database 110 are a single database. During playback of a video through video server 106, a video identifier of the video being streamed can be used to retrieve a time coding of the video. The time coding can be played simultaneously (or near simultaneously) to the streaming video. During playback of the video, when a flag of the time coding is reached (by the progression of the playback) a metadata item is retrieved based on a unique identifier of the metadata related to the flag of the time coding. The metadata is then retrieved by the unique identifier by the video server and transmitted and displayed at a client interface on client device 102. Databases 108 and 110 can be one or more databases in a variety of configurations. For example, databases 108 and 110 can be one or more relational databases. In other examples, databases 108 and 110 can be a cloud-based storage or a content management system.

Figure 2A:
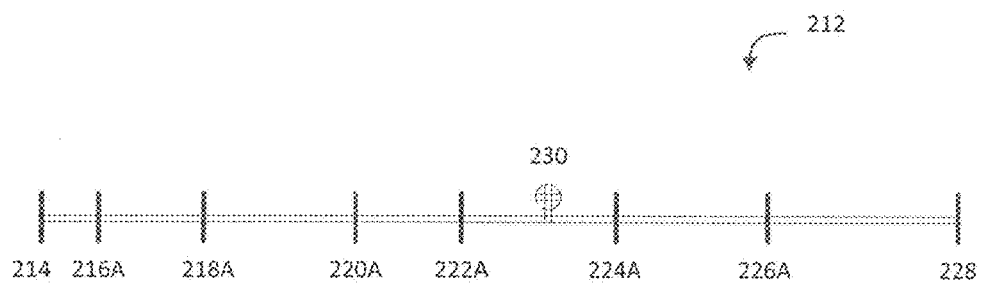
FIG. 2A-2B show an example time coding and example client interface of a metadata stream in accordance with at least some embodiments of the present invention.
Figure 2B:
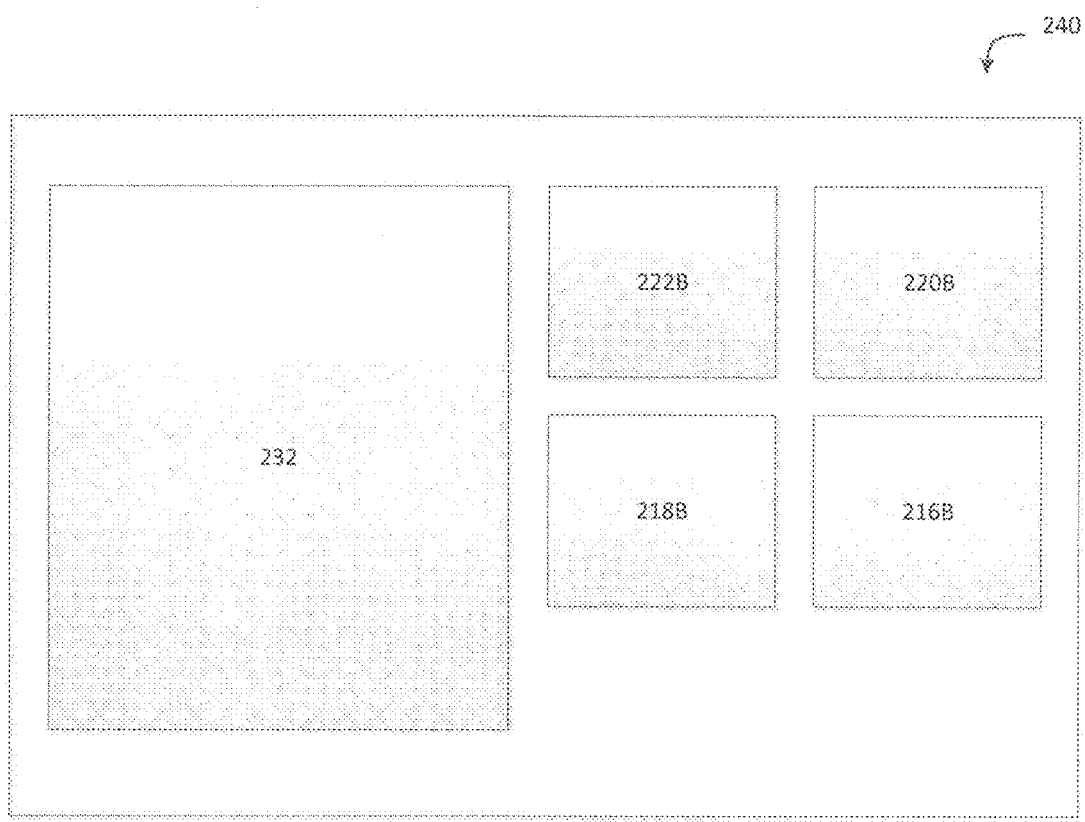

FIG. 2A and FIG. 2B show an example time coding 212 of video stream 232. For example, video 232 can be selected and streamed to a client interface from a third-party service, as shown above. The video stream 232 can have an accompanying time coding 212 retrieved from time coding database 110. Upon initiating of playback of video stream 232, time coding 212 is also initiated. Time coding 212 can correspond to the playback progression of video stream 232. For example, when playback of video stream 232 is at 30 seconds, time coding 212 is also at 30 seconds. In some examples, the correspondence of time coding 212 with video stream 232 can have an error of margin of +/−X percent. In some embodiments, X may vary from 1-10. In some embodiments, X may vary from 1-5. In some embodiments, X may be 1. In some embodiments, X may vary from 0-1.

Still referring to FIG. 2A and FIG. 2B, time coding 212 can have one or more flags (e.g., 216A, 218A, 220A, 222A, 224A, 226A, etc.). The flags of time coding 212 correspond to different, specific points of playback progression. The flags can also include a unique identifier of metadata. When the playback progress of time coding 212 reaches a flag, a metadata item associated with the unique identifier can be retrieved from metadata database 108. The retrieved metadata can be displayed at a metadata stream on client interface 240. Current progression can be shown at marker 230. For example, when progression reaches flag 216A, metadata 216B is displayed at the metadata stream. Thus, when marker 230 reaches flag 218A, metadata item 218B can be displayed and metadata item 216B is pushed down the metadata stream. The progression starts at the beginning 214 of video 232 and continues through the remaining flags 220A, 222A, 224A, and 226A until the end 228 of video stream 232.

The metadata, as discussed above, is displayed synchronously with the video playback. The metadata items, also independently, can progress in a specific pattern on the metadata stream of client interface 240. For example, the sequencing of the metadata on metadata stream can move from top left, to top right, to bottom left, to bottom right, etc. and as shown in FIG. 2B. The sequencing of the metadata stream is to present a narration of the video being streamed that enhances the video being streamed to reinforce the cognitive recognition of metadata as they appear in video being streamed. In some examples, the metadata stream can have multiple columns and rows. In other examples, the sequencing of the metadata on metadata stream can move from top right to top left, to bottom right, to bottom left, etc. In other examples, the sequencing of the metadata on metadata stream can move from top left, to top right, to bottom right, to bottom left, etc. In other examples, the sequencing of the metadata on metadata stream can move from top right, to top left, to bottom left, to bottom right, etc.

Table 1 provides an exemplary JavaScript code that may be utilized to control the operation of an exemplary on-line video player such as, but not limited to, JW Player (LongTail Ad Solutions, Inc., NY), in accordance with one or more principles of the present invention.

TABLE 1

```
(function( Timeline, window, document ) {
var
EMPTY_STRING = "",
jwReady = false,
jwLoaded = false,
jwCallbacks = [ ];
function onJWPlayerAPIReady( ) {
  jwReady = true;
  var i = jwCallbacks.length;
  while( i-- ) {
    jwCallbacks[ i ]( );
    delete jwCallbacks[ i ];
  }
};
function jwplayerReadyCheck( ) {
  if ( window.jwplayer ) {
    onJWPlayerAPIReady( );
  } else {
    setTimeout( jwplayerReadyCheck, 100 );
  }
}
function isJWPlayerReady( ) {
  // If the jwplayer API isn't injected, do it now.
  if ( !jwLoaded ) {
    if( !window.jwplayer ) {
      var tag = document.createElement( "script" );
      tag.src = "https://jwpsrv.com/library/zaIF4JI9EeK2FSIACpYGxA.js";
      var firstScriptTag = document.getElementsByTagName( "script" )[ 0 ];
      firstScriptTag.parentNode.insertBefore( tag, firstScriptTag );
    }
    jwLoaded = true;
    jwplayerReadyCheck( );
  }
  return jwReady;
}
function addJWPlayerCallback( callback ) {
  jwCallbacks.unshift( callback );
}
function HTMLJWPlayerVideoElement( id ) {
  if( !window.postMessage ) {
    throw "ERROR: HTMLJWPlayerVideoElement requires window.postMessage";
  }
  var self = new Timeline._MediaElementProto( ),
    parent = typeof id === "string" ? document.querySelector( id ) : id,
```

TABLE 1-continued

```
impl = {
    src: EMPTY_STRING,
    networkState: self.NETWORK_EMPTY,
    readyState: self.HAVE_NOTHING,
    seeking: false,
    autoplay: EMPTY_STRING,
    preload: EMPTY_STRING,
    controls: false,
    loop: false,
    poster: EMPTY_STRING,
    volume: 1,
    muted: false,
    currentTime: 0,
    duration: NaN,
    ended: false,
    paused: true,
    error: null
},
playerReady = false,
catchRoguePauseEvent = false,
catchRoguePlayEvent = false,
mediaReady = false,
loopedPlay = false,
player,
playerPaused = true,
mediaReadyCallbacks = [ ],
playerState = −1,
lastLoadedFraction = 0,
firstPlay = true,
firstPause = false;
// Namespace all events we'll produce
self._eventNamespace =
Timeline.guid( "HTMLJWPlayerVideoElement::" );
self.parentNode = parent;
// Mark this as JWPlayer
self._util.type = "JWPlayer";
function addMediaReadyCallback( callback ) {
    mediaReadyCallbacks.unshift( callback );
}
function waitForMetaData( ){
    var duration = player.getDuration( );
    //JWPlayer sets the duration only after the video has started playing
    //Hence, we assume that when duration is available all
    //other metadata is also ready
    if(duration == −1 || duration == undefined){
        setTimeout(waitForMetaData, 0);
    } else {
        impl.duration = duration
        self.dispatchEvent( "durationchange" );
        playerReady = true;
        impl.readyState = self.HAVE_METADATA;
        self.dispatchEvent( "loadedmetadata" );
        self.dispatchEvent( "loadeddata" );
        impl.readyState = self.HAVE_FUTURE_DATA;
        self.dispatchEvent( "canplay" );
        mediaReady = true;
        var i = 0;
        while( mediaReadyCallbacks.length ) {
            mediaReadyCallbacks[ i ]( );
            mediaReadyCallbacks.shift( );
        }
        // We can't easily determine canplaythrough, but will send anyway.
        impl.readyState = self.HAVE_ENOUGH_DATA;
        self.dispatchEvent( "canplaythrough" );
    }
}
function onReady( ) {
    // JWPlayer needs a play/pause to force ready state.
    waitForMetaData( );
}
if ( catchRoguePauseEvent ) {
    catchRoguePauseEvent = false;
} else if ( firstPause ) {
    firstPause = false;
    onReady( );
} else {
    onPause( );
}
}
function onPlayEvent( ) {
    if ( firstPlay ) {
        // fake ready event
        firstPlay = false;
        // Set initial paused state
        if( impl.autoplay || !impl.paused ) {
            impl.paused = false;
            addMediaReadyCallback( onPlay );
            onReady( );
        } else {
            firstPause = true;
            catchRoguePlayEvent = true;
            player.pause( true );
        }
    } else if ( catchRoguePlayEvent ) {
        catchRoguePlayEvent = false;
        catchRoguePauseEvent = true;
        // Repause without triggering any events.
        player.pause( true );
    } else {
        onPlay( );
    }
}
function onSeekEvent( ) {
    if( impl.seeking ) {
        onSeeked( );
    }
}
function onPlayerReady( ) {
    player.onPause( onPauseEvent );
    player.onTime(function( ) {
        if( !impl.ended && !impl.seeking ) {
            impl.currentTime = player.getPosition( );
            self.dispatchEvent( "timeupdate" );
        }
    });
    player.onSeek( onSeekEvent );
    player.onPlay(function( ) {
        if ( !impl.ended ) {
            onPlayEvent( );
        }
    });
    player.onBufferChange( onProgress );
    player.onComplete( onEnded );
    player.play( true );
}
function getDuration( ) {
    return player.getDuration( );
}
function onPlayerError( e ) {
    var err = { name: "MediaError" };
    err.message = e.message;
    err.code = e.code || 5;
    impl.error = err;
    self.dispatchEvent( "error" );
}
function destroyPlayer( ) {
    if ( !( playerReady && player ) ) {
        return;
    }
    player.destroy( );
}
function changeSrc( aSrc ) {
    if ( !self._canPlaySrc( aSrc ) ) {
        impl.error = {
            name: "MediaError",
            message: "Media Source Not Supported",
            code: MediaError.MEDIA_ERR_SRC_NOT_SUPPORTED
        };
        self.dispatchEvent( "error" );
        return;
    }
    var playerVars = self._util.parseUri( aSrc ).queryKey;
    // Show/hide controls. Sync with impl.controls and prefer URL value.
    impl.controls = playerVars.controls = playerVars.controls || impl.controls;
    impl.src = aSrc;
    // Make sure JWPlayer is ready, and if not, register a callback
    if( !isJWPlayerReady( ) ) {
        addJWPlayerCallback( function( ) { changeSrc( aSrc ); } );
        return;
    }
```

TABLE 1-continued

```
    if ( playerReady ) {
      destroyPlayer( );
    }
    var params = {
      width: "100%",
      height: "100%",
      autostart: impl.autoplay,
      controls: impl.controls
    };
    // Source can either be a single file or multiple files that represent
    // different quality
    if(typeof aSrc == "string"){
      params["file"] = aSrc;
    } else {
      params["sources"] = aSrc;
    }
    jwplayer( parent.id ).setup(params);
    player = jwplayer( parent.id );
    player.onReady( onPlayerReady );
    player.onError( onPlayerError );
    jwplayer.utils.log = function( msg, obj ) {
      if( typeof console !== "undefined" &&
      typeof console.log !== "undefined" ) {
        if ( obj ) {
          console.log( msg, obj );
        } else {
          console.log( msg );
        }
      }
      if( msg === "No suitable players found and fallback enabled" ) {
        onPlayerError({
          message: msg,
          code: 4
        });
      }
    };
    impl.networkState = self.NETWORK_LOADING;
    self.dispatchEvent( "loadstart" );
    self.dispatchEvent( "progress" );
  }
  function getCurrentTime( ) {
    return impl.currentTime;
  }
  function changeCurrentTime( aTime ) {
    impl.currentTime = aTime;
    if( !mediaReady ) {
      addMediaReadyCallback( function( ) {
        onSeeking( );
        player.seek( aTime );
      });
      return;
    }
    onSeeking( );
    player.seek( aTime );
  }
  function onSeeking( ) {
    impl.seeking = true;
    // jwplayer plays right after a seek, we do not want this.
    if( impl.paused ) {
      catchRoguePlayEvent = true;
    }
    self.dispatchEvent( "seeking" );
  }
  function onSeeked( ) {
    impl.ended = false;
    impl.seeking = false;
    self.dispatchEvent( "timeupdate" );
    self.dispatchEvent( "seeked" );
    self.dispatchEvent( "canplay" );
    self.dispatchEvent( "canplaythrough" );
  }
  function onPlay( ) {
    impl.paused = false;
    if ( playerReady && playerPaused ) {
      playerPaused = false;
// Only 1 play when video.loop=true
      if ( ( impl.loop && !loopedPlay ) || !impl.loop ) {
        loopedPlay = true;
        self.dispatchEvent( "play" );
      }
      self.dispatchEvent( "playing" );
    }
  }
  function onProgress( ) {
    self.dispatchEvent( "progress" );
  }
  self.play = function( ) {
    self.dispatchEvent( "play" );
    impl.paused = false;
    if ( !mediaReady ) {
      addMediaReadyCallback( function( ) { self.play( ); } );
      return;
    }
    if( impl.ended ) {
      changeCurrentTime( 0 );
      impl.ended = false;
    }
    player.play( true );
  };
  function onPause( ) {
    impl.paused = true;
    if ( !playerPaused ) {
      playerPaused = true;
      self.dispatchEvent( "pause" );
    }
  }
  self.pause = function( ) {
    impl.paused = true;
    if( !mediaReady ) {
      addMediaReadyCallback( function( ) { self.pause( ); } );
      return;
    }
    player.pause( true );
  };
  function onEnded( ) {
    if ( impl.loop ) {
      changeCurrentTime( 0 );
    } else {
      impl.ended = true;
      onPause( );
      self.dispatchEvent( "timeupdate" );
      self.dispatchEvent( "ended" );
    }
  }
  function setVolume( aValue ) {
    impl.volume = aValue;
    if( !mediaReady ) {
      addMediaReadyCallback( function( ) {
        setVolume( impl.volume );
      });
      return;
    }
    player.setVolume( impl.volume * 100 );
    self.dispatchEvent( "volumechange" );
  }
  function setMuted( aValue ) {
    impl.muted = aValue;
    if( !mediaReady ) {
      addMediaReadyCallback( function( ) { setMuted( impl.muted ); } );
      return;
    }
    player.setMute( aValue );
    self.dispatchEvent( "volumechange" );
  }
  function getMuted( ) {
    return impl.muted;
  }
  Object.defineProperties( self, {
    src: {
      get: function( ) {
        return impl.src;
      },
      set: function( aSrc ) {
        if ( aSrc && aSrc !== impl.src ) {
          changeSrc( aSrc );
        }
      }
    },
    autoplay: {
      get: function( ) {
```

TABLE 1-continued

```
    return impl.autoplay;
  },
  set: function( aValue ) {
    impl.autoplay = self._util.isAttributeSet( aValue );
  }
},
loop: {
  get: function( ) {
    return impl.loop;
  },
  set: function( aValue ) {
    impl.loop = self._util.isAttributeSet( aValue );
  }
},
width: {
  get: function( ) {
    return self.parentNode.offsetWidth;
  }
},
height: {
  get: function( ) {
    return self.parentNode.offsetHeight;
  }
},
currentTime: {
  get: function( ) {
    return getCurrentTime( );
  },
  set: function( aValue ) {
    changeCurrentTime( aValue );
  }
},
duration: {
  get: function( ) {
    return getDuration( );
  }
},
ended: {
  get: function( ) {
    return impl.ended;
  }
},
paused: {
  get: function( ) {
    return impl.paused;
  }
},
seeking: {
  get: function( ) {
    return impl.seeking;
  }
},
readyState: {
  get: function( ) {
    return impl.readyState;
  }
},
networkState: {
  get: function( ) {
    return impl.networkState;
  }
},
volume: {
  get: function( ) {
    return impl.volume;
  },
  set: function( aValue ) {
    if ( aValue < 0 || aValue > 1 ) {
      throw "Volume value must be between 0.0 and 1.0";
    }
    setVolume( aValue );
  }
},
muted: {
  get: function( ) {
    return impl.muted;
  },
  set: function( aValue ) {
    setMuted( self._util.isAttributeSet( aValue ) );
  }
```

TABLE 1-continued

```
},
error: {
  get: function( ) {
    return impl.error;
  }
},
buffered: {
  get: function ( ) {
    var timeRanges = {
      start: function( index ) {
        if ( index === 0 ) {
          return 0;
        }
        //throw fake DOMException/INDEX_SIZE_ERR
        throw "INDEX_SIZE_ERR: DOM Exception 1";
      },
      end: function( index ) {
        var duration;
        if ( index === 0 ) {
          duration = getDuration( );
          if( !duration ) {
            return 0;
          }
          return duration * ( player.getBuffer( ) / 100 );
        }
        //throw fake DOMException/INDEX_SIZE_ERR
        throw "INDEX_SIZE_ERR: DOM Exception 1";
      },
      length: 1
    };
    return timeRanges;
  }
}
});
self._canPlaySrc = Timeline.HTMLJWPlayerVideoElement._canPlaySrc;
self.canPlayType = Timeline.HTMLJWPlayerVideoElement.canPlayType;
return self;
}
Timeline.HTMLJWPlayerVideoElement = function( id ) {
  return new HTMLJWPlayerVideoElement( id );
};
}( Timeline, window, document ));
```

Table 2 provides an exemplary JavaScript code that may be utilized to display items in a video stream played via the exemplary on-line JW Player.

Figure 19:
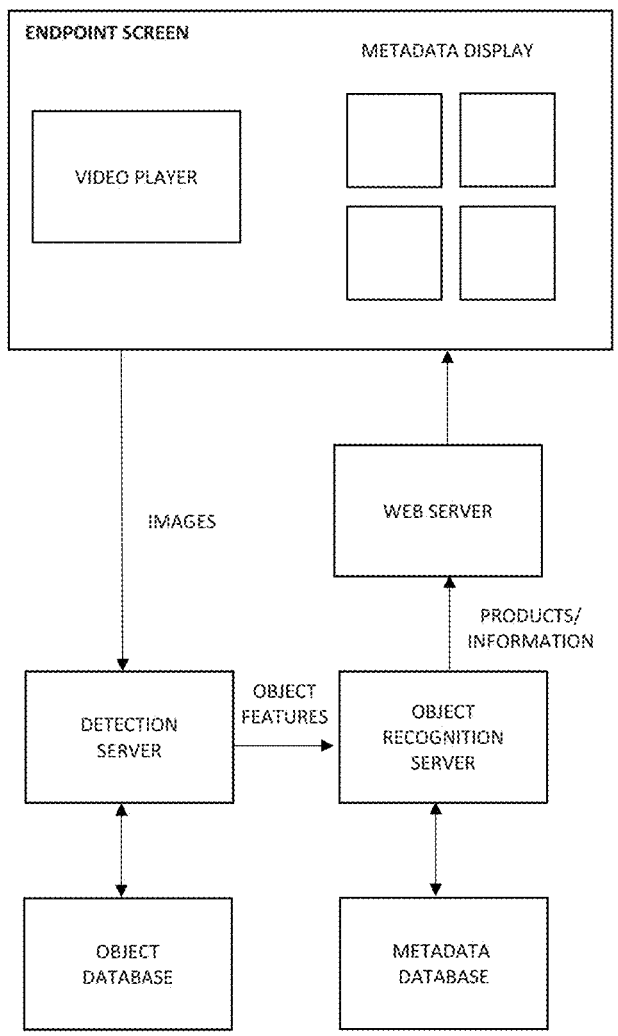
FIG. 19 shows a block diagram of an exemplary computer architecture utilized by some embodiments of the present invention in accordance with at least some embodiments of the present invention.

In another example, the sequencing of metadata can be based on an automated visual recognition algorithm (AVRA). FIG. 19 shows a block diagram of exemplary computer architecture that is programmed to execute AVRA. AVRA can match metadata appearing in the video with metadata stored in the metadata database 108. For example, when AVRA determines a match the corresponding metadata can be include in the metadata stream, according to the sequencing shown above. In one example, AVRA can use an appearance-based method for matching metadata that includes, but is not exclusive to: edge matching, divide-and-conquer search, grey scale matching, gradient matching, or large model-bases. In another example, AVRA can use a feature-based methods that includes, but is not exclusive to: interpretation trees, hypothesize and test, pose consistency and clustering, invariance, geometric hashing, scale-invariant feature transform (SIFT), or Speeded Up Robust Features (SURF).

TABLE 2

```
(function ($) {
  document.addEventListener("DOMContentLoaded", function ( ) {
    var wrapper =
      Timeline.HTMLJWPlayerVideoElement( "#mediaPlayer" );
    wrapper.controls = true;
```

TABLE 2-continued

```
wrapper.src = 'https://content.jwplatform.com/feeds/ZtaxfjWj.json';
$tim = Timeline( wrapper );
    $tim.on("timeupdate", function( ) {
    var curtime = Math.floor($tim.currentTime( ));
    if($('.product-item-sec-'+curtime).is(":hidden")) {
        var viewwidth = $('.view-new-media-products').width( );
        $('.view-new-media-products').width(($('.product-item-
sec-'+curtime).length * 220) + viewwidth);
        $('.product-item-sec-'+curtime).slideToggle('slow').css('display',
'flex');
        $('.product-item-sec-'+curtime).addClass('product-item-played');
    }
    });
    $tim.play( );
        ga('send', 'event', 'video', 'Play', VIDEO NAME);
    }, false);
})(jQuery);
```

In other examples, the metadata stream can overlay the video stream. For example, when a flag is reached during the progression of playback of the video stream, the corresponding metadata can be displayed on the video stream as an overlay object. The metadata can be positioned to "pop-up" when the flag is reached and stay present on the video stream until the next flag is reached at which point the next metadata replaces the previously metadata. Alternatively, the metadata can be repositioned on the video stream upon the playback reaching the next flag. In other examples, the new metadata can be positioned in a different portion of the video stream to not overlap (or minimally overlap) the first displayed metadata. In these embodiments, the metadata is overlaid in a manner not to disturb (or minimally disturb) the playback of the video stream.

Figure 3A:
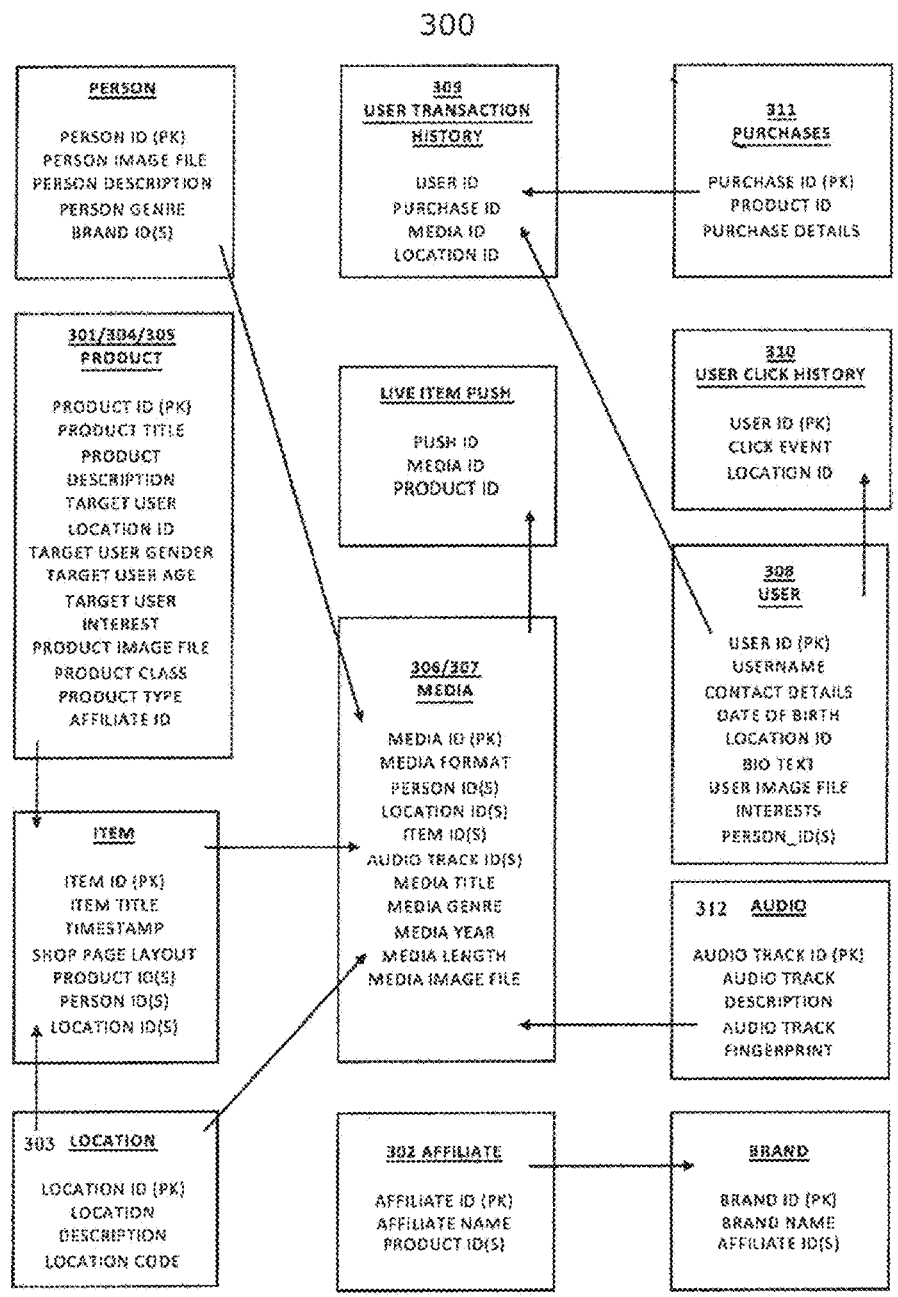

Referring to FIG. 3A, a block diagram of an example data architecture 300 according to an embodiment of the present disclosure. Referring to FIGS. 3B-3H, detailed descriptions of exemplary data components of the exemplary data architecture 300. In some embodiments, data architecture 300 can include product categories 301. For example, product categories can include electronics, home, garden, tools, automotive, books, sports, outdoors, clothing, jewelry, or any other category that can be used to define products and services. Product categories 301 can include a plurality of products 304. In other embodies, products 304 can include services. For example, products and services 304 can include, televisions, radios, audio players, stereos, couches, chairs, dining tables, lamps, vases, plants, flowers, shovels, drills, hammers, cars, trucks, motorcycles, baseball gloves, soccer balls, hunting rifles, t-shirts, jeans, slacks, travel, airplane travel, hotel accommodations, education services, lectures, tutorials, tours, or any other consumer product or service. The data architecture 300 can also include audio track data tracking component 312.

Data architecture 300 can also include affiliates 302. In some embodiments, affiliates 302 can be retailers. In some embodiments, affiliates can provide users options to purchase the products 304. Data architecture can further comprise a correlation 305 between products 304 and affiliates 302. In some embodiments, the correlation 305 can enable a user to view a product or service and also an affiliate where the product or service can be purchased. In some embodiments, the correlation 305 can enable the products 304 and affiliates 302 to be associated with one or more media item in a media item time coded data tracking component 306/307 that, for example, correlates metadata of products/service with the time coding of presentations (e.g., videos, live streaming, etc.). For example, the media item time coded data tracking component 306/307 may associate/correlate a time coded artistic work with products 304.

The data architecture 300 can further comprise a data location component 303 which may be utilized to correlate/associate/match various data items within the data architecture 300 with a particular geographic location.

Still referring to FIGS. 3A-3I, a user transaction 309 can request from the correlation 306, details of products 304 viewed during the broadcast schedule 309. The user transaction request 309 can be an audio print, text search, voice search, geo-tag or customer preferences. In some embodiments, the user transaction request 309 can also be performed automatically by a user profile 308, purchase and history 311 or impression and click history 310. The impression or click history 310 can include user-voting counts for artistic works and items to be created. This data can be used to predict demands (i.e., of a user) for artistic works views, item purchases, and product purchases. The user profile 308 can include name, address, e-mail address, payment information, product preferences, service preferences, audio and video preferences, and demographic information (e.g., age, gender, etc.). The purchases and history 311 can include purchases made by a user (e.g., of products or service 304 from affiliates 302). The purchases and history 311 can also include a history of audio prints 312 (e.g., artistic works, videos, audio, etc.) watched or request. The impressions and click history 310 can include products viewed or clicked through during the playback of an audio print 312. In some embodiments, the user transaction request 309 can be performed in the background and the user can be notified of potential interested matches based on their profile 308, purchase and history 311 or impression and click history 310. In response to a user transaction 309, the user can receive the products 304 and affiliates 302 associated with the audio print in the media item time coded data tracking component 306/307.

Figure 4:
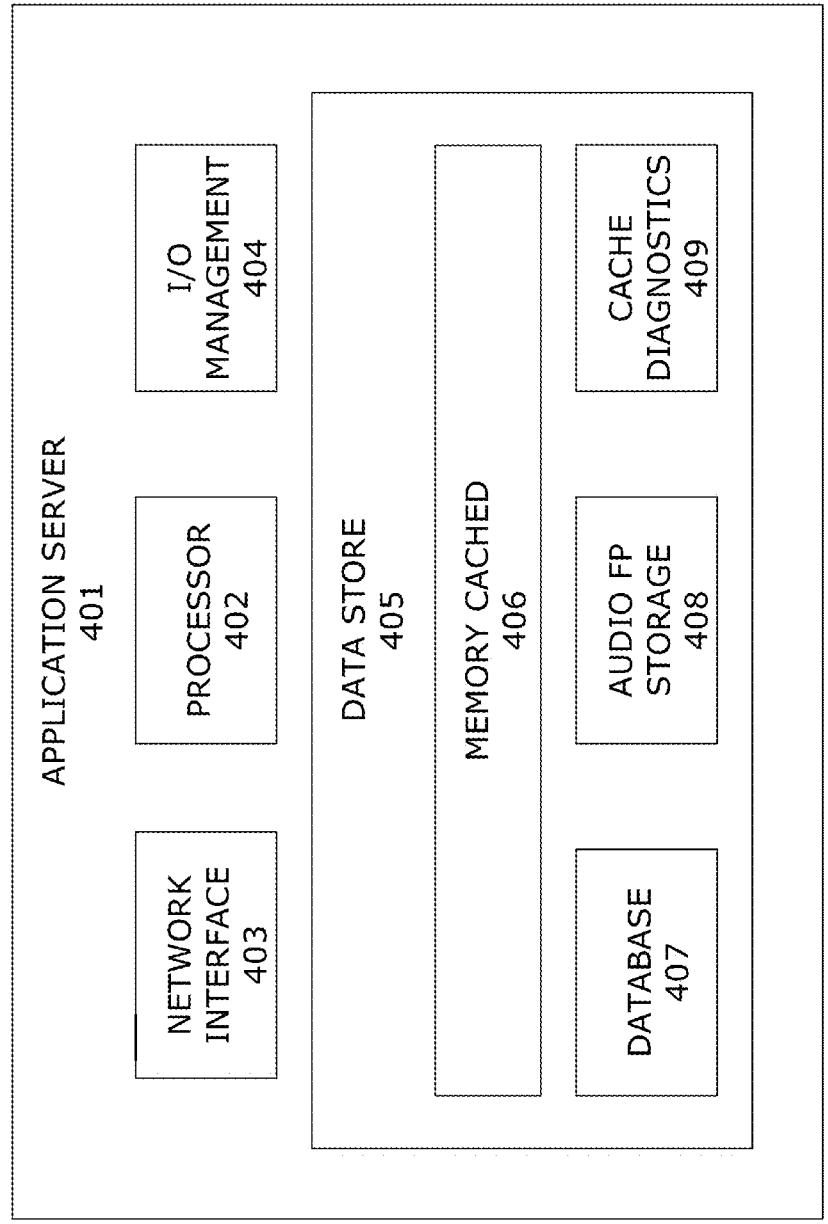
FIG. 4 is a block diagram of an example system architecture in accordance with at least some embodiments of the present invention.

FIG. 4 illustrates a block diagram of an example back-end system architecture 400. Back-end system architecture 400 can include one or more application servers 401. In some embodiments, the application server 401 can include a software framework to handle all application operations and interactions with the users. Application server 401 can include one or more processors 402 for carrying out the instructions of the application server 401. Application server 401 can include a network interface 403 for transmitting and receiving data (e.g., over the Internet, etc.). Application server 401 can include an I/O management 404 can be configured to monitor all input and output to and from the application server 401. Application server 401 can include a data store 405. Data store 405 can include a cache memory 406, database 407, audio print storage 408, and a cache diagnostics 409. The cache memory 406 and cache diagnostics 409 are utilized to manage system performance and enhance the user experience through delivering a highly responsive system.

FIG. 5A is a block diagram illustrating an example front-end and back-end system architecture. System architecture 500 can include a front-end 501 and a back-end 507. Front-end 501 can be an electronic device. For example, a smartphone, tablet, personal digital assistant, desktop computer, laptop, etc. The front-end 501 can run a variety of operating systems. For example, WebOS 502, iOS 503, Android 504, Windows 505, Fire 506, etc. The operating system can be run on front-end 501 by at least a processor and memory (not shown). Front-end 501 can be communicatively coupled to back-end 507 through a communication network (e.g., the Internet).

In some embodiments, back-end 507 can be a cloud-computing environment. In other embodiments, back-end 507 can be one or more servers (e.g., webserver with a WAP gateway). Back-end 507 can include a search platform 508. In some embodiments, the search platform 508 can receive search requests from users. For example, a search platform 508 can receive a search request for an artistic work from a user of a front-end device. The search platform can be communicatively coupled to application server 514. In some embodiments application server 514 can be substantially similar to application server 401 (as illustrated in FIG. 4). In some embodiments, application server 514 can include an application framework 509. Application framework 509 can be configured to handle all application operations and interactions with the users. Application server 514 can also include a load balance 510, HTTP performance 511, push 512 and wsgi server 513. The load balance 510 balances and distributes system workload across multiple computing resources, and the HTTP performance 511, push 512 and WSGI servers 513 can serve as a universal interface between web servers and web applications.

Figure 5B:
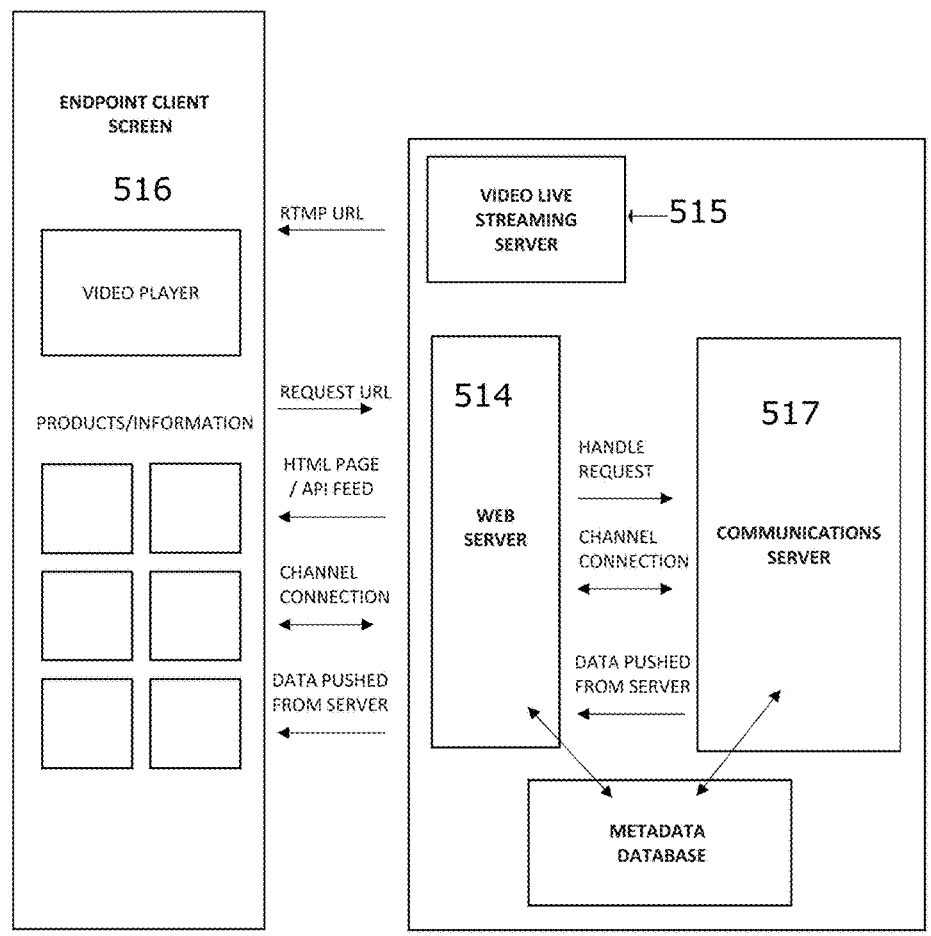

FIG. 5B is a block diagram illustrating an exemplary live operation of the exemplary front-end and back-end system architecture. In some embodiments, there may be two simultaneous synchronous broadcasts:
1) a live broadcast of a video content, and
2) a live item query-response protocol that may utilize communications technology such as web sockets technology to push data that contains, for example, product information, being contemporaneously referenced during, for example, the live video stream, from the exemplary application server 514, utilizing a particular communication channel or a plurality of distinct communication channels (i.e., agnostic multi-channel simultaneous distribution).

In some embodiments, as, for example, shown in FIG. 5B, an exemplary live video may be captured by a camera and transmitted to an encoder. In some embodiments, the encoder transmits the video data to an exemplary video streaming server 515. In some embodiments, the video streaming server 515 may transcode and distribute the live stream to endpoint video players that may be embedded on endpoint screens 516. In some embodiments, pieces of metadata may be added and stored in a database before the live video stream broadcast.

In some embodiments, while the live video is being streamed, corresponding, matched pieces of metadata may be pushed to the endpoint screen 516, utilizing a dedicated duplex communication channel connecting the endpoint with the respective exemplary servers and the exemplary database. In some embodiments, the web server 514 may be at least operationally integrated with an exemplary communications server 517 which may trigger a push request to push the corresponding, matched pieces of metadata stored in a database. In some embodiments, the corresponding, matched pieces of metadata may be then simultaneously transmitted in packages across one or more distinct communications channels to the endpoints 516 and are displayed on screens of computing devices of viewers.

In some embodiments, the exemplary live item query-response protocol may be based on passing one or more primary key data pieces to the exemplary application server 514 as a particular frame is being shown or about to be shown to a viewer.

FIG. 6-7 show a client interface of an example video service for synchronizing a streaming video with related metadata before initiation and right after initiation of video playback. In at least one embodiment client interface 640 can include a search bar 641, a video title 642, a video stream 643, a related-items tiles 644, and a metadata stream 645. In at least one embodiment client interface 640 can be configured for viewing through a web browser or similar application. In at least one embodiment client interface 640 can be configured for use on a smart phone, tablet, personal computer, server or any other computing device capable of displaying and streaming video content. In at least one embodiment, search bar 641 can be used to search for one or more videos to stream. Search bar 641 can search a proprietary database with entries of available videos. Search bar 641 can use a third-party search engine. In at least one embodiment, video title 642, can display the title of the video and people related to the video, for example, actors or musicians. In at least one embodiment, video stream 643 can be embedded in the client interface 640 and can be configured to stream a video. In at least one embodiment, video stream 643 can be time-coded with metadata. For example, a music video, a movie, a television show, or any other kind of video formatted for streaming. In at least one embodiment, video stream 643 can be streamed from a third-party content provider.

Still referring to FIG. 6-7, client interface 640 can display related items tiles 644 representing one or more metadata items related to the video stream 643. For example, a video stream can be playing a music video that was shot in New York City and Los Angeles. The metadata items associated with the music video can include New York City and Los Angeles. The related items tile 644 can display the metadata items relating to New York City and Los Angeles. The related items tiles 644 can display metadata in tile format as shown in FIG. 6. The metadata can be configured to be displayed randomly or in order on appearance in the video stream. The related-items tile can be populated and displayed before the video stream begins playback. The related-items tiles can be expanded to show more details about metadata items. For example, if New York City is selected and expanded, the client interface can display facts, hotels, airfare, restaurants, transportation, shops, or other data related to the selected metadata.

Still referring to FIG. 6-7, in at least one embodiment, metadata stream 645 can be configured to synchronically display one or more metadata items related to the video stream 643. FIG. 6 illustrates video stream 643 before the initiation of playback, and thus metadata stream 645 is in an inactive state. FIG. 7 illustrates video stream 643 after initiation of playback, and thus metadata stream 645 has been initiated and is active. In at least one embodiment, during playback of a time-coded video stream 643, metadata stream 645 can display the metadata according to the time-coding. For example, a music video can be time-coded with metadata items at the 15, 37, 92, and 104 second marks. Accordingly, when the playback of the video reaches the 15 second mark, a first metadata item can be displayed in the metadata stream, at the 37 second mark a second metadata item can be displayed in the metadata stream, at 92 second mark a third metadata item can be displayed in the metadata stream, and at the 104 second mark a fourth metadata item can be displayed in the metadata stream. In at least one embodiment, a smoothing algorithm can be applied to the time-code (e.g., quantization, etc.) In at least one embodiment, there are be one or more metadata items time coded in a video stream. In at least one embodiment, the metadata stream can be configured to display photographs or graphic representations of the metadata. In at least one embodiment, the metadata can be displayed chronologically based on the time-coding of the video stream. In at least one embodiment, the metadata stream can be configured to display the metadata as an image tag cloud. An "image tag cloud" can be defined as a visual representation for images, photographs or the like, used to depict keyword metadata (tags) on websites. The importance of each tag can be weighted based on importance. This format is useful for quickly perceiving the most prominent image (based on its larger size). The importance can be based on popularity of the metadata.

In at least one embodiment, the metadata stream can be configured to display the metadata as tiles of the same or differing sizes. The size of the tiles can be based on different metrics, for example, click-through rate, ratings, rankings, etc.

FIG. 8 illustrates a client interface of an example video service with an active metadata stream. In some embodiments, playback of video stream 643 has begun. During playback video stream 643, the time-coding of video stream 643 can trigger display of metadata items in metadata stream 645. For example, video stream 643 can be set in New York City and the time-coding can include metadata items related to New York City (e.g., Times Square hotel 646, helicopter tours 647, New York City apartment rentals 648, etc.). For example, at time code 15 seconds, Times Square hotel 646 can be presented. Since, the metrics of Times Square Hotel 646 is greater than a predetermined threshold value, the tile representing Times Square Hotel 646 is larger than other metadata tiles 647 and 648. At time code 24 seconds a metadata item of helicopter tours 647 can be presented in the metadata stream 645 and at time 34 seconds a metadata item of New York City apartment rentals 648 can be displayed in the metadata stream 645. In some embodiments, the tiles representing metadata items can be displayed chronologically with the playback of video stream 643. In other embodiments, the most highly ranked tiles (e.g., based on metrics) presenting metadata items can be fixed to the top of video stream 643.

FIG. 9-10 illustrates a client interface of a selection of a tile of from metadata stream 645. For example, the tile representing Times Square hotel 646 has been selected by a user input at the client interface of client device 102. In response to the selection of the tile, client interface can expand the tile to represent a detailed view of the accompanying metadata item (e.g., Times Square hotel 646, New York City apartment rentals 648, etc.). In some embodiments, the detailed view of the accompanying metadata item (e.g., Times Square hotel 646, New York City apartment rentals 648, etc.) can display, photographs, abstract, names, social network connections (e.g., Facebook, Twitter, Pinterest, Google, etc.), save metadata (e.g., in user profile or favorites), purchase (e.g., one or more nights stay at Times Square hotel 646), and related items (e.g., alternative and similar items).

FIG. 11-12 illustrate a client interface of an example video service where a metadata item is displayed in the metadata stream. In some embodiments, client interface 640 can display video stream 643 and metadata stream 645. Video stream 643 can display an object 649A (e.g., product, service, etc.). In this embodiment, object 649A is a speaker. Object 649A can be displayed in video stream 643 between a specific window of time (e.g., between the 52 second mark and 56 second mark). Video steam 643 can be time coded at the specific window of time with metadata item 649B, corresponding to object 649A. Thus, metadata item 649B (which corresponds to object 649A) can be displayed in metadata stream 645 at the specific window of time shown in video stream 643 based on the time-coding of video stream 643. In another example, object 650A (e.g., red shoes) can be shown in video stream 643 at a time coding 64 seconds. At playback time 64 seconds of the time coding, metadata item 650B can be displayed in metadata stream 645. Object 650A directly corresponds to metadata item 650B. Thus, a user of client interface 640 can watch a video stream and see objects (e.g., 649A, 650A, etc.) they might be interested in and information about the objects (e.g., metadata items 649B, 650B, etc.) can be displayed and selected from metadata stream 645.

FIG. 13 illustrates a client interface of a selection of a tile from the metadata stream. For example, the tile representing metadata 650B can be selected by a user input at the client interface of a client device 102. In response to the selection of the tile, client interface can expand the tile to represent a detailed view of the accompanying metadata item 650B (e.g., red shoes, etc.). In some embodiments, alternatives 651 to the metadata item 650B can be displayed. Alternatives 651 can be items related or items similar to metadata item 650B. For example, alternatives can be items that are more affordable, newer model, similar brand, competing item, etc.

FIG. 14 illustrates a client interface of an example video service where a metadata item is displayed in the metadata stream. In some embodiments, client interface 640 can display video stream 643 and metadata stream 645. For example, video stream 643 can display an object 652A (e.g., 1970 Dodge Challenger). Metadata item 652B (e.g., 1970 Dodge Challenger) corresponding to object 652A (e.g., 1970 Dodge Challenger) can be displayed at metadata stream 645. During playback of video stream 643, an object 652A can be displayed at a specific time window (e.g., 93 seconds to 98 seconds). Video stream 643 can include an accompanying time coding and during the specific time window can display metadata item 652B corresponding to object 652A. When the playback of video stream 643 reaches a flag in the time coding, metadata item 652B can be displayed in metadata stream 645.

FIG. 15 illustrates a client interface of a selection of a tile of from the metadata stream. For example, the tile representing metadata 652B can be selected by a user input at client interface 640 of a client device. In response to the selection of the tile, client interface 640 can expand the tile to represent a detailed view of the accompanying metadata item 652B (e.g., 1970 Dodge Challenger). In some embodiments, related celebrities 653 to metadata items 650B can be displayed. Related celebrities can be famous people with an affiliation to metadata item 650B. For example, "Jessie J" can be affiliated with the 1970 Dodge Challenger 1970 through ownership or sponsorship with Dodge.

FIG. 16 illustrates a client interface of additional features of an example video service for synchronizing a streaming video with related metadata. Client interface 640 can include a community of users 654. The community of users can share playlists, favorites, videos, can comment on videos and metadata items, etc. Each user of the community can have a profile identifying information of the users, for example, username, name, address, payment information, birthdate, favorite artists, songs, etc. Client interface 640 can include trending videos 655 and trending artists 656. Trending videos 655 and artists 656 can be based on user interactions with client interface 640, for example, based on likes, watches, click-through, etc. In other examples, trending videos 655 and artists 656 can be based on third-party services (e.g., Billboard music charts, etc.). Client interface 640 can also include recent comments 657. Recent comments 657 can be the most time recent comments on videos of the video service. In some embodiments, the recent comments 657 are tailored for the user. For example, recent comments 657 can be for videos most recently viewed by the user.

Figure 17:
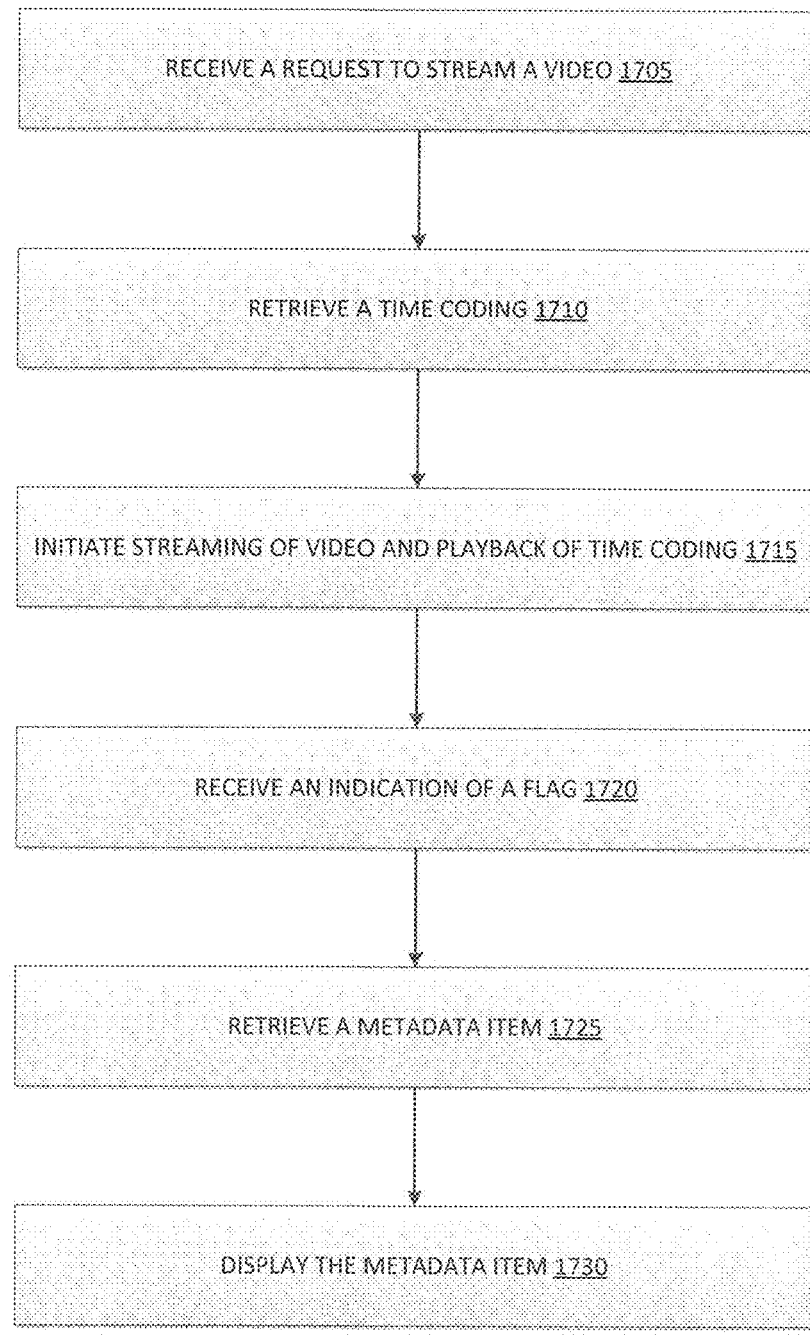
FIG. 17 shows a flow chart of an example method of organizing and displaying a metadata item stream in accordance with at least some embodiments of the present invention.

The method shown in FIG. 17 is provided by way of example, as there are a variety of ways to carry out the method. Additionally, while the example method is illustrated with a particular order of blocks, those of ordinary skill in the art will appreciate that FIG. 17 and the blocks shown therein can be executed in any order that accomplishes the technical advantages of the present disclosure and can include fewer or more blocks than illustrated.

Each block shown in FIG. 17 represents one or more processes, methods or subroutines, carried out in the example method. The blocks shown in FIG. 17 can be implemented in a system such as system 100 shown in FIG. 1. The flow chart illustrated in FIG. 17 will be described in relation to and make reference to at least the elements of system 100 shown in FIG. 1 and the client interfaces shown in FIGS. 6-16.

Method 1700 can begin at block 1705. At block 1705, a server can receive a request to stream a video. For example, a user of a client interface of a client device 102 can select to watch a video. In response, the client interface can generate a request to send from the client device 102 to server 106 to stream a video. Server 106 can in response, locate the video from a third-party service or local storage communicatively coupled to server 106. When a server has received a request, method 1700 can proceed to block 1710.

At block 1710, server 106 can retrieve a time coding associated with the video that was requested. For example, server 106 can send a request to retrieve a time coding to time coding database 110. The request can include a unique identifier of the video to stream. When the server has retrieved the time coding, method 1700 can proceed to block 1715.

At block 1715, the server can initiate streaming of the video and playback of the time coding. For example, the server 106 can transmit, over a network 104, to client device 102 the video. Client device 102 can display through a client interface the streaming video. The server 106 can also initiate playback of the time coding to correspond to the streaming of the video. In other examples, the time coding and be transmitted and initiated at client device 102. In other examples, the time coding can be embedded in the streaming video. When streaming video and playback of the time coding has been initiated, method 1700 can proceed to step 1720.

At block 1720, the server can receive an indication of a flag. For example, during playback of the time coding there can be one or more flags at specific times during the time coding. When playback of the time coding reaches a flag, the server 106 can receive an indication of the flag along with a unique identifier. The unique identifier can correspond to one or more metadata items. When the server has received an indication of a flag, method 1700 can proceed to step 1725.

At step 1725, the server can retrieve the metadata item. For example, server 106 can use the unique identifier associated with the flag can retrieve an associated metadata item from metadata database 108. When the server has retrieved the one or more metadata items, method 1700 can proceed to step 1730.

At step 1730, the metadata item can be displayed. For example, server 106 can transmit the metadata item to the client device 102 over the network 104. Client device 102 can display the metadata item on the metadata stream 645 of the client interface. When the metadata item has been displayed, method 1700 can end.

Figure 18A:
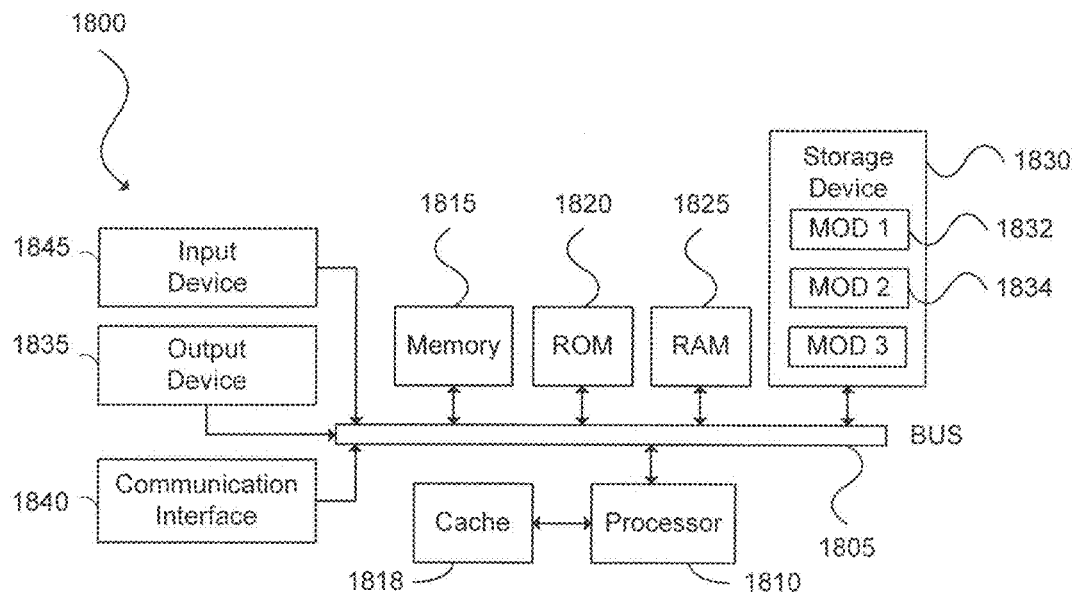
FIG. 18A shows an example system for implementing various embodiments of the present technology in accordance with at least some embodiments of the present invention.
Figure 18B:
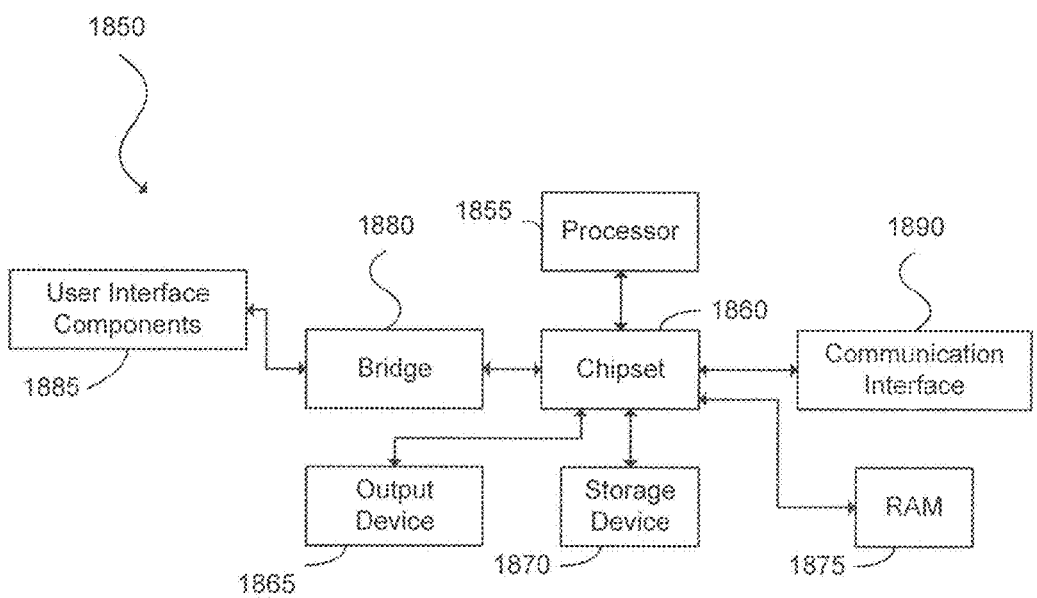
FIG. 18B shows an example system for implementing various embodiments of the present technology in accordance with at least some embodiments of the present invention.

FIG. 18A and FIG. 18B show exemplary possible system examples. The more appropriate example will be apparent to those of ordinary skill in the art when practicing the present technology. Persons of ordinary skill in the art will also readily appreciate that other system examples are possible.

FIG. 18A illustrates a system bus computing system architecture 1800 wherein the components of the system are in electrical communication with each other using a bus 1805. Exemplary system 1800 includes a processing unit (CPU or processor) 1810 and a system bus 1805 that couples various system components including the system memory 1815, such as read only memory (ROM) 1820 and random access memory (RAM) 1825, to the processor 1810. The system 1800 can include a cache of high-speed memory connected directly with, in close proximity to, or integrated as part of the processor 1810. The system 1800 can copy data from the memory 1815 and/or the storage device 1830 to the cache 1818 for quick access by the processor 1810. In this way, the cache can provide a performance boost that avoids processor 1810 delays while waiting for data. These and other modules can control or be configured to control the processor 1810 to perform various actions. Other system memory 1815 may be available for use as well. The memory 1815 can include multiple different types of memory with different performance characteristics. The processor 1810 can include one or more processors and a hardware module or software module, such as module 1 1832, module 2 1834, and module 3 1836 stored in storage device 1830, configured to control the processor 1810 as well as a special-purpose processor where software instructions are incorporated into the actual processor design. The processor 1810 may essentially be a completely self-contained computing system, containing multiple cores or processors, a bus, memory controller, cache, etc. A multi-core processor may be symmetric or asymmetric.

To enable user interaction with the computing device 1800, an input device 1845 can represent any number of input mechanisms, such as a microphone for speech, a touch-sensitive screen for gesture or graphical input, keyboard, mouse, motion input, speech and so forth. An output device 1835 can also be one or more of a number of output mechanisms known to those of skill in the art. In some instances, multimodal systems can enable a user to provide multiple types of input to communicate with the computing device 1800. The communications interface 1840 can govern and manage the user input and system output. There is no restriction on operating on any particular hardware arrangement and therefore the basic features here may easily be substituted for improved hardware or firmware arrangements as they are developed.

Storage device 1830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1825, read only memory (ROM) 1820, and hybrids thereof.

The storage device 1830 can include software modules 1832, 1834, 1836 for controlling the processor 1810. Other hardware or software modules are contemplated. The storage device 1830 can be connected to the system bus 1805. In one aspect, a hardware module that performs a particular function can include the software component stored in a computer-readable medium in connection with the necessary hardware components, such as the processor 1810, bus 1805, display 1835, and so forth, to carry out the function.

FIG. 18B illustrates a computer system 1850 having a chipset architecture that can be used in executing the described method and generating and displaying a graphical client interface (GUI). Computer system 1850 is an example of computer hardware, software, and firmware that can be used to implement the disclosed technology. System 1850 can include a processor 1855, representative of any number of physically and/or logically distinct resources capable of executing software, firmware, and hardware configured to perform identified computations. Processor 1855 can communicate with a chipset 1860 that can control input to and output from processor 1855. In this example, chipset 1860 outputs information to output 1865, such as a display, and can read and write information to storage device 1870, which can include magnetic media, and solid state media, for example. Chipset 1860 can also read data from and write data to RAM 1875. A bridge 1880 for interfacing with a variety of client interface components 1885 can be provided for interfacing with chipset 1860. Such client interface components 1885 can include a keyboard, a microphone, touch detection and processing circuitry, a pointing device, such as a mouse, and so on. In some embodiments, inputs to system 1850 can come from any of a variety of electronic sources.

Chipset 1860 can also interface with one or more communication interfaces 1890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1855 analyzing data stored in storage 1870 or 1875. Further, the machine can receive inputs from a user via client interface components 1885 and execute appropriate functions, such as browsing functions by interpreting these inputs using processor 1855.

It can be appreciated that exemplary systems 1800 and 1850 can have more than one processor 1810 or be part of a group or cluster of computing devices networked together to provide greater processing capability.

Figure 20:
FIGS. 20-28 show various illustrative examples of some aspects of the client interface of example video services in accordance with at least some embodiments of the present invention.

FIG. 20 shows a screenshot of an exemplary video player and an exemplary timestamped metadata item stream with a "follow" button.

Figure 21:
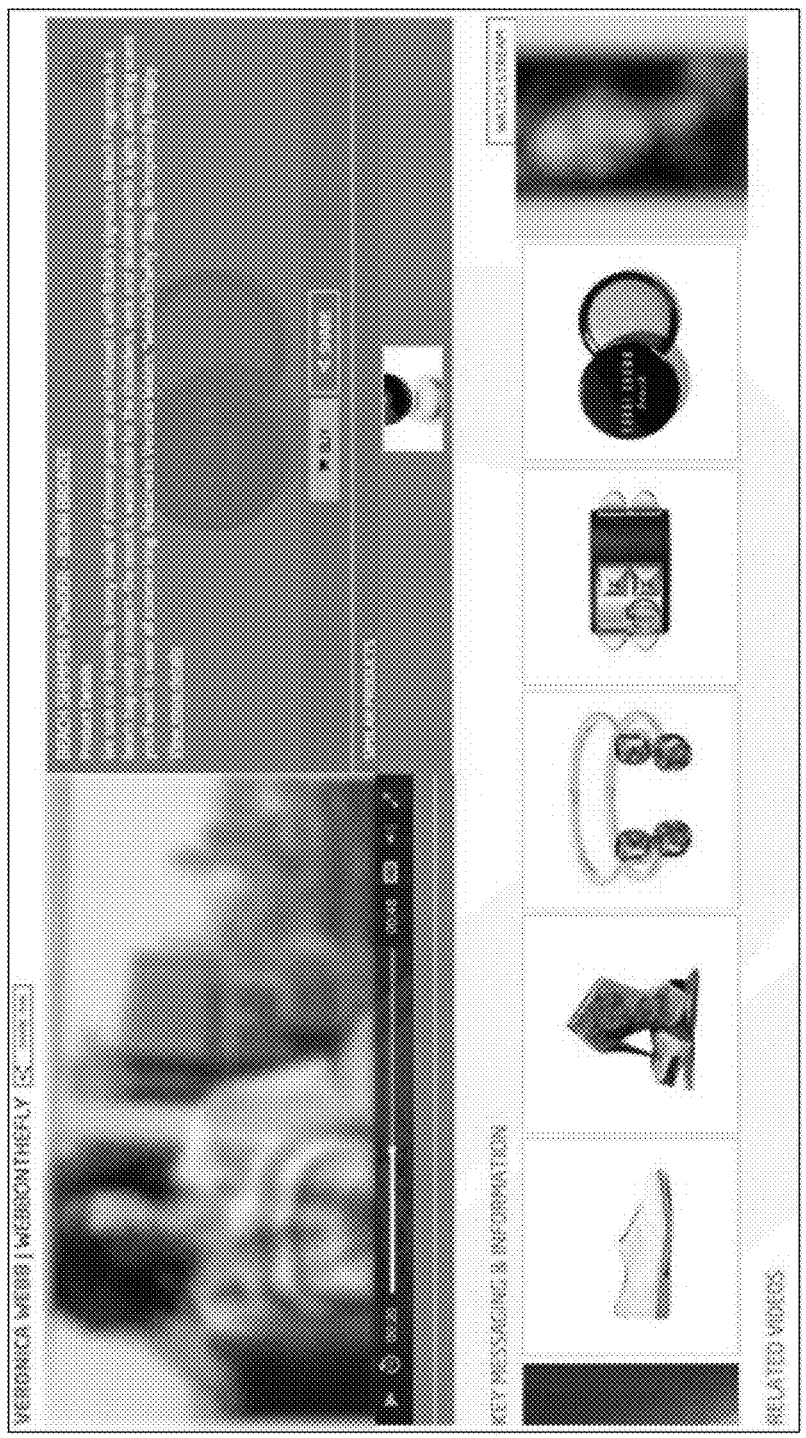

FIG. 21 shows a screenshot of an exemplary video player and an exemplary timestamped metadata item stream with "buy" button and product alternatives choices.

Figure 22:
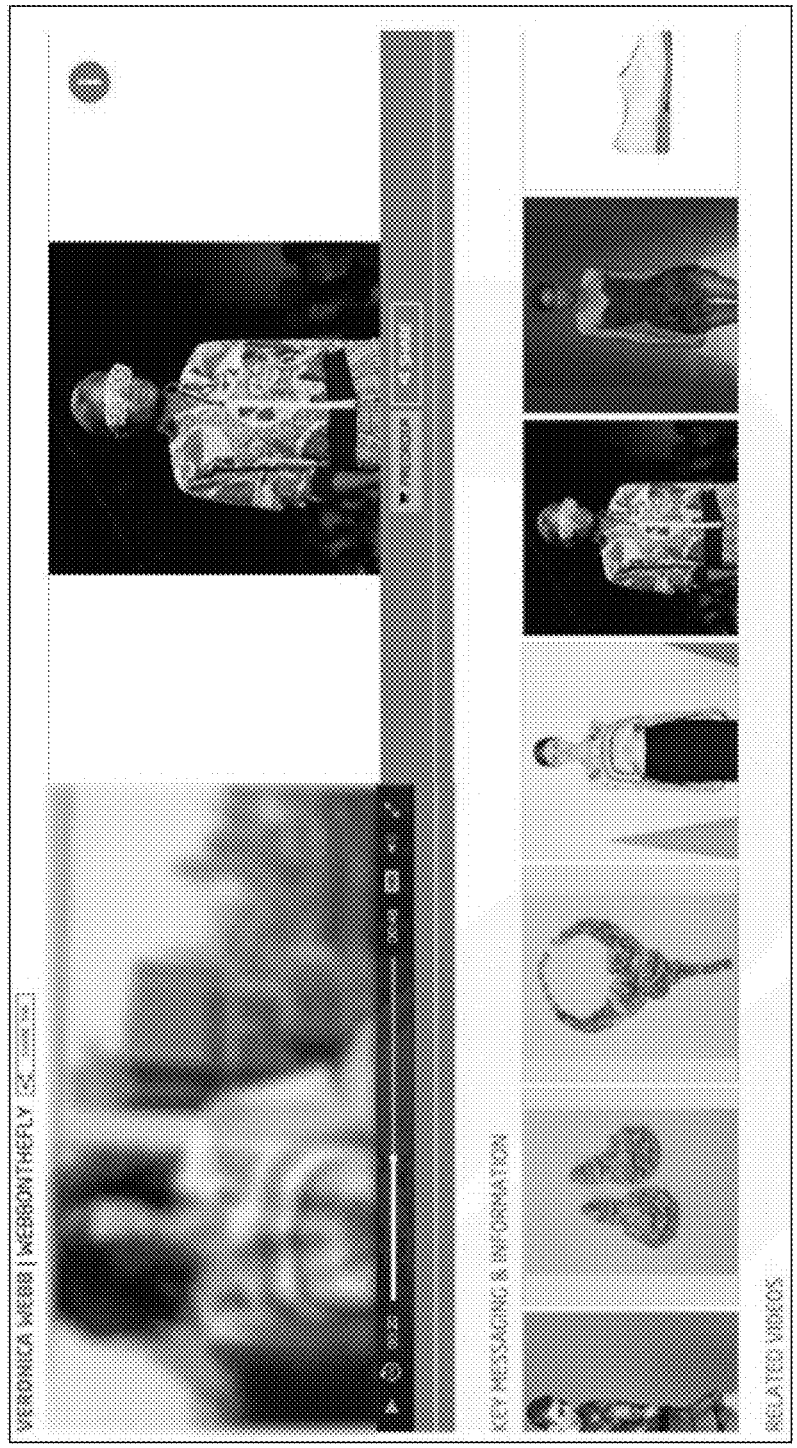

FIG. 22 shows a screenshot of an exemplary video player and an exemplary timestamped metadata item stream with a "preorder" button.

Figure 23:

FIG. 23 shows a screenshot of an exemplary video player and an exemplary timestamped metadata item stream with "real estate" and "travel" buttons.

Figure 24:
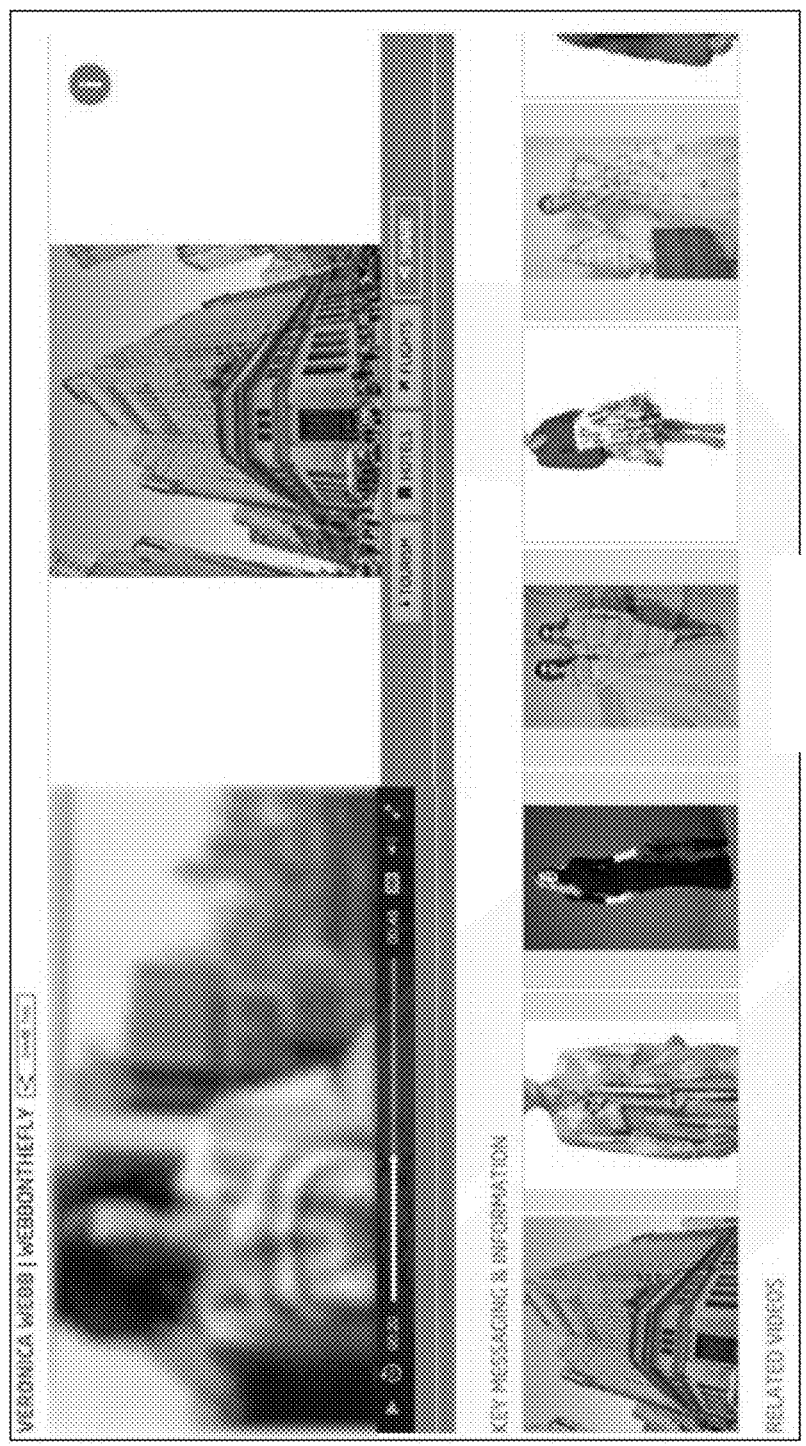

FIG. 24 shows a screenshot of an exemplary video player and an exemplary timestamped metadata item stream with "tourism," "hotels" and "flights" button.

Figure 25:
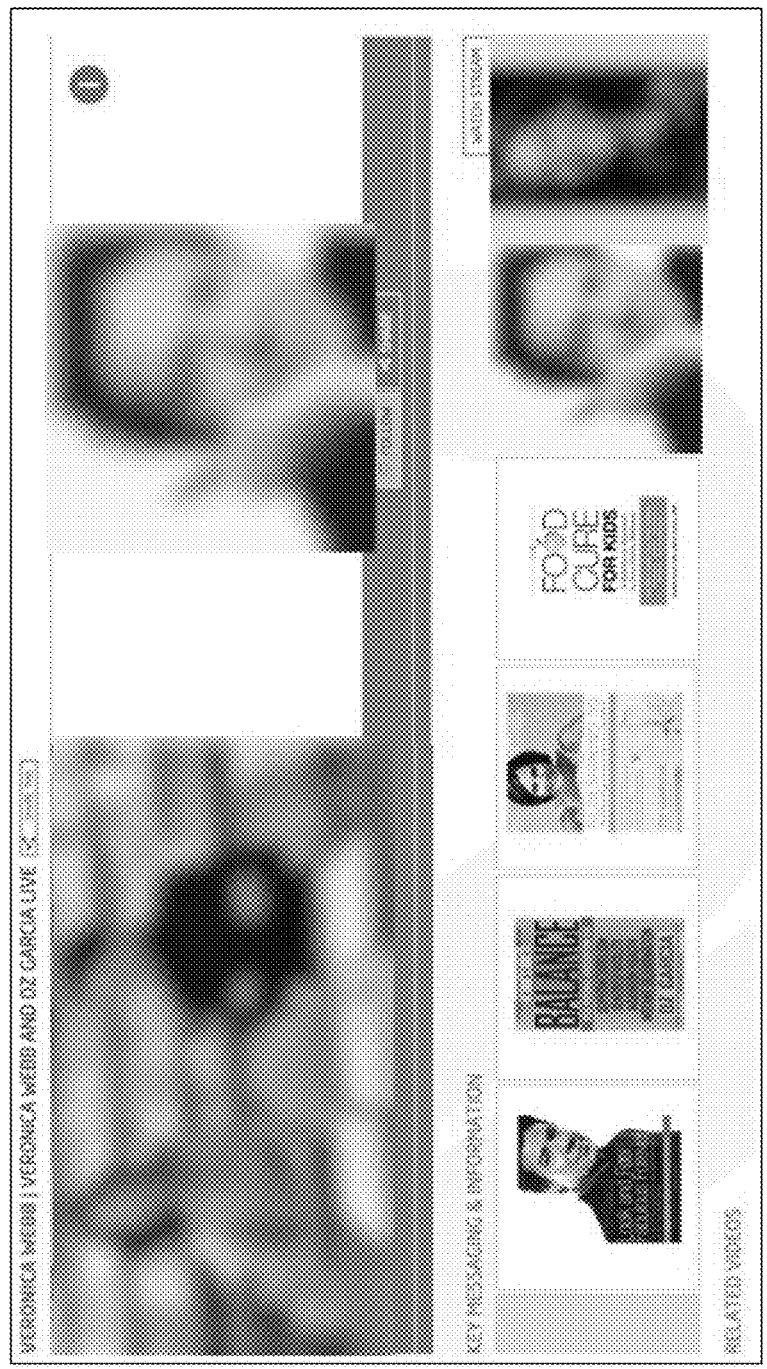

FIG. 25 shows a screenshot of an exemplary video player and an exemplary live item stream.

Figure 26:

FIG. 26 shows a screenshot of an exemplary video player and an exemplary live item metadata stream in a mobile web format.

Figure 27:
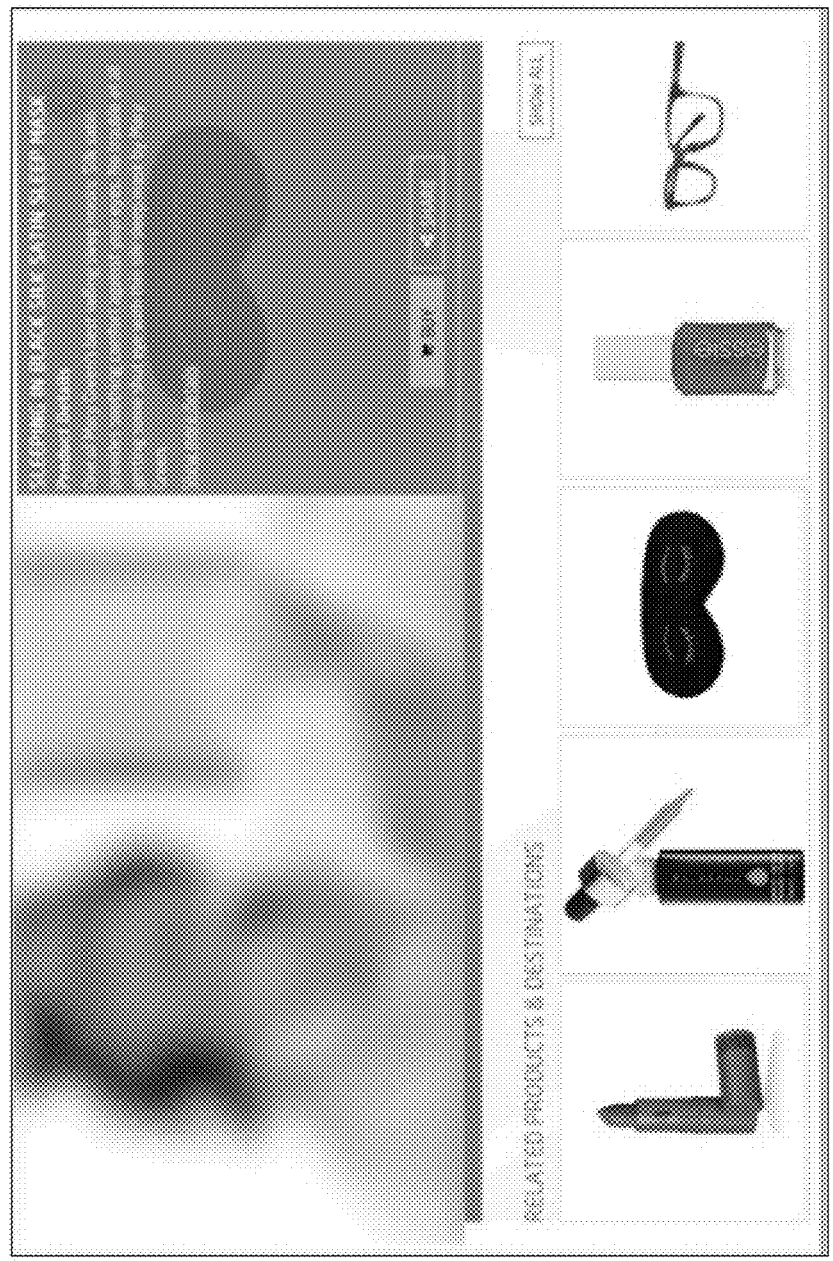

FIG. 27 shows a screenshot of an exemplary video player and an exemplary metadata stream in iFrame and tablet format.

Figure 28:

FIG. 28 shows a screenshot of an exemplary video player and an exemplary metadata stream in a mobile app format.

In at least one embodiment, the present technology can be implemented as a software or a hardware module. In at least one embodiment, the present technology causes a processor to execute instructions. The software module can be stored within a memory device or a drive. The present technology can be implemented with a variety of different drive configurations including Network File System (NFS), Internet Small Computer System Interface (iSCSi), and Common Internet File System (CIFS). Additionally, the present technology can be configured to run on VMware ESXi (which is an operating system-independent hypervisor based on the VMkernel operating system interfacing with agents that run on top of it. Additionally, the present technology can be configured to run on Amazon® Web Service in VPC.

Examples within the scope of the present disclosure may also include tangible and/or non-transitory computer-readable storage media for carrying or having computer-executable instructions or data structures stored thereon. Such non-transitory computer-readable storage media can be any available media that can be accessed by an exemplary special purpose computer of the present invention, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer, or special purpose processing device to perform a certain function or group of functions. Computer-executable instructions also include program modules that are executed by computers in stand-alone or network environments. In some embodiments, the inventive program modules of the present invention may include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In some embodiments, the present invention provides for an exemplary computer system which includes at least the following components: at least one graphical user interface client; at least one dedicated application server; where the at least one dedicated application server includes a non-transitory memory storing instructions and at least one server processor; where, when executing the instructions by the at least one server processor, the at least one dedicated application server is configured to operationally connect to the at least one graphical user interface client; where the at least one dedicated application server is associated with at least one metadata item database, including metadata related to plurality of items; where the at least one graphical user interface client is configured to utilize at least one processor of a computing device of a user to: generate at least one graphical user interface that includes: at least one video player area that is configured to display at least one video player, and a plurality of metadata areas that are configured to display, in real-time, streamed metadata items that are related to at least a portion of content of at least one video streamed by the at least one video player at a particular playing time to form a metadata stream; receive, from the user, a request to stream a video; initiate the streaming of the video; for at least one portion of content of the video being streamed by the at least one video player: determine the plurality of streamed metadata items related to the at least one portion of the content of the video, based on at least one of: 1) determining at least one time coding flag being associated with the at least one portion of the content of the video and transmitting the at least one time coding flag to the at least one dedicated application server, where the at least one dedicated application server is configured to query the at least one metadata item database to identify a first plurality of streamed metadata items related to at least one first item of the plurality of items and return the first plurality of streamed metadata items the at least one graphical user interface client; 2) causing the at least one portion of the content to evaluated by a visual recognition algorithm; where the visual recognition algorithm is at least configured to: identify at least one video content item present in the at least one portion of the content of the video at the particular playing time, match the at least one video content item to at least one second item of the plurality of items whose metadata is stored in the at least one metadata item database, and return a second plurality of streamed metadata items corresponding to the at least one second item to at least one graphical user interface client; and 3) causing to display at the plurality of metadata areas, via a particular visual pattern, one of: i) the first plurality of streamed metadata items, ii) the second plurality of streamed metadata items, and iii) any combination of at least one first streamed metadata item of the first plurality of streamed metadata items and at least one second streamed metadata item of the second plurality of streamed metadata items.

In some embodiments, at least one metadata area of the plurality of metadata areas is configured to be adjacent to the at least one video player area In some embodiments, at least one metadata area of the plurality of metadata areas is configured to overlay the at least one video player area.

In some embodiments, each item is one of a product, a service, or a combination of both.

In some embodiments, the at least one video content item is an individual.

In some embodiments, the at least one graphical user interface client is further configured to utilize the at least one processor of the computing device of the user to: utilize a video identifier of the video to electronically query the at least one dedicated application server to obtain a time coding sequence associated with the video, and playback the time coding sequence in parallel with the streaming of the video to determine the at least one time coding flag being associated with the at least one portion of the content of the video.

In some embodiments, the at least one graphical user interface client is further configured to synchronize the particular visual pattern of the metadata stream with the streaming of the video by the at least one video player.

In some embodiments, the particular visual pattern is independent from the streaming of the video by the at least one video player.

In some embodiments, the visual recognition algorithm is configured to match the at least one video content item to the at least one second item of the plurality of items by utilizing at least one appearance-based algorithm.

In some embodiments, the at least one appearance-based algorithm is selected from the group consisting of: edge matching algorithm, divide-and-conquer search algorithm, grey scale matching algorithm, gradient matching algorithm, large model-bases algorithm, and any combination thereof.

In some embodiments, the visual recognition algorithm is configured to match the at least one video content item to the at least one second item of the plurality of items by: identifying at least one feature of the at least one video content item, and utilizing at least one feature-based algorithm to match, based on at least one feature of the at least one video content item, the at least one video content item to the at least one second item of the plurality of items whose metadata is stored in the at least one metadata item database.

In some embodiments, the at least one feature-based algorithm is selected from the group consisting of: interpretation trees algorithm, hypothesize and test algorithm, pose consistency and clustering algorithm, invariance algorithm, geometric hashing algorithm, scale-invariant feature transform (SIFT) algorithm, Speeded Up Robust Features (SURF) algorithm, and any combination thereof.

In some embodiments, the present invention provides for an exemplary inventive method that includes at least the following steps: generating, by at least one graphical user interface client, least one graphical user interface that includes: at least one video player area that is configured to display at least one video player, and a plurality of metadata areas that are configured to display, in real-time, streamed metadata items that are related to at least a portion of content of at least one video streamed by the at least one video player at a particular playing time to form a metadata stream; where the at least one graphical user interface client is configured to operationally connect to at least one dedicated application server; where the at least one dedicated application server includes: a non-transitory memory storing instructions and at least one server processor; where, when executing the instructions by the at least one server processor, the at least one dedicated application server is configured to operationally connect to the at least one graphical user interface client; where the at least one dedicated application server is associated with at least one metadata item database, including metadata related to plurality of items; receiving, by the at least one graphical user interface client, from the user, a request to stream a video; initiating, by the at least one graphical user interface client, the streaming of the video; for at least one portion of content of the video being streamed by the at least one video player: determining, by the at least one graphical user interface client, the plurality of streamed metadata items related to the at least one portion of the content of the video, based on at least one of: 1) determining at least one time coding flag being associated with the at least one portion of the content of the video and transmitting the at least one time coding flag to the at least one dedicated application server, where the at least one dedicated application server is configured to query the at least one metadata item database to identify a first plurality of streamed metadata items related to at least one first item of the plurality of items and return the first plurality of streamed metadata items the at least one graphical user interface client; 2) causing the at least one portion of the content to evaluated by a visual recognition algorithm; where the visual recognition algorithm is at least configured to: identify at least one video content item present in the at least one portion of the content of the video at the particular playing time, match the at least one video content item to at least one second item of the plurality of items whose metadata is stored in the at least one metadata item database, and return a second plurality of streamed metadata items corresponding to the at least one second item to at least one graphical user interface client; and 3) causing to display at the plurality of metadata areas, via a particular visual pattern, one of: i) the first plurality of streamed metadata items, ii) the second plurality of streamed metadata items, and iii) any combination of at least one first streamed metadata item of the first plurality of streamed metadata items and at least one second streamed metadata item of the second plurality of streamed metadata items.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the scope of the disclosure.

What is claimed is:

1. A computer system, comprising:
  at least one graphical user interface client;
  at least one dedicated application server;
  wherein the at least one dedicated application server comprises
    a non-transitory memory storing instructions and
    at least one server processor;
  wherein, when executing the instructions by the at least one server processor, the at least one dedicated application server is configured to operationally connect to the at least one graphical user interface client;
  wherein the at least one dedicated application server is associated with at least one metadata item database, comprising metadata related to plurality of items;
  wherein the at least one graphical user interface client is configured to utilize at least one processor of a computing device of a user to:
    generate at least one graphical user interface that comprises:
      at least one media player area that is configured to display at least one media player, and
      a plurality of metadata areas that are configured to display, in real-time, a plurality of streamed metadata items that are related to at least a portion of content of at least one media presentation streamed by the at least one media player at a particular playing time to form a metadata stream;
    receive, from the user, a request to stream the at least one media presentation;
    stream at least one media presentation;
      for at least one portion of content of the at least one media presentation being streamed by the at least one media player at the particular playing time:
      determine a plurality of metadata items related to the at least one portion of the content of the at least one media presentation, based on at least one of:
        1) determining, separately from the streaming of the at least one portion of the at least one media presentation, at least one time coding flag being associated with the at least one portion of the content of the at least one media presentation and transmitting the at least one time coding flag to the at least one dedicated application server,
        wherein the at least one dedicated application server is configured to query the at least one metadata item database to identify a first plurality of metadata items related to at least one first item of the plurality of items and return the first plurality of metadata items to the at least one graphical user interface client; and
        2) causing the at least one portion of the content to be evaluated by a visual recognition algorithm;
        wherein the visual recognition algorithm is at least configured to:
          identify at least one media content item present in the at least one portion of the content of the at least one media presentation at the particular playing time,
          match the at least one media content item to at least one second item of the plurality of items whose metadata is stored in the at least one metadata item database, and
          return a second plurality of metadata items corresponding to the at least one second item to at least one graphical user interface client; and
    causing to display, at the plurality of metadata areas, the plurality of streamed metadata items so that each streamed metadata item progresses, during the particular playing time, from at least a first metadata area of the plurality of metadata areas to a second metadata area of the plurality of metadata areas based, at least in part, on a particular visual sequence;
    wherein the particular visual sequence of the progression of each streamed metadata item progresses from the first metadata area of the plurality of metadata areas to the second metadata area of the plurality of metadata areas is independent from to the at least one portion of the content of the at least one media presentation;
    wherein the plurality of streamed metadata items comprises one of:
      i) the first plurality of metadata items,
      ii) the second plurality of metadata items, and
      iii) any combination of at least one first metadata item of the first plurality of metadata items and at least one second metadata item of the second plurality of metadata items.

2. The computer system of claim 1, wherein at least one metadata area of the plurality of metadata areas is configured to be adjacent to the at least one media player area.

3. The computer system of claim 1, wherein at least one metadata area of the plurality of metadata areas is configured to overlay the at least one media player area.

4. The computer system of claim 1, wherein each item is one of a product, a service, or a combination of both.

5. The computer system of claim 1, wherein the at least one media content item is a representation of an individual.

6. The computer system of claim 1, wherein the at least one graphical user interface client is further configured to utilize the at least one processor of the computing device of the user to:
   utilize a media identifier of the at least one media presentation to electronically query the at least one dedicated application server to obtain a time coding sequence associated with the at least one media presentation,
   wherein the time coding sequence is a software entity that is distinct from the at least one media presentation, and
   separately playback the time coding sequence in parallel with the streaming of the at least one media presentation to determine the at least one time coding flag being associated with the at least one portion of the content of the at least one media presentation.

7. The computer system of claim 1, wherein the at least one graphical user interface client is further configured to synchronize the particular visual pattern of the metadata stream with the streaming of the at least one media presentation by the at least one media player.

8. The computer system of claim 1, wherein the visual recognition algorithm is configured to match the at least one media content item to the at least one second item of the plurality of items by utilizing at least one appearance-based algorithm.

9. The computer system of claim 8, wherein the at least one appearance-based algorithm is selected from the group consisting of: edge matching algorithm, divide-and-conquer search algorithm, grey scale matching algorithm, gradient matching algorithm, large model-bases algorithm, and any combination thereof.

10. The computer system of claim 1, wherein the visual recognition algorithm is configured to match the at least one media content item to the at least one second item of the plurality of items by:
   identifying at least one feature of the at least one media content item, and
   utilizing at least one feature-based algorithm to match, based on at least one feature of the at least one media content item, the at least one media content item to the at least one second item of the plurality of items whose metadata is stored in the at least one metadata item database.

11. The computer system of claim 10, wherein the at least one feature-based algorithm is selected from the group consisting of: interpretation trees algorithm, hypothesize and test algorithm, pose consistency and clustering algorithm, invariance algorithm, geometric hashing algorithm, scale-invariant feature transform (SIFT) algorithm, Speeded Up Robust Features (SURF) algorithm, and any combination thereof.

12. The computer system of claim 1, wherein the at least one media presentation is a live streaming.

13. A computer-implemented method, comprising:
   generating, by at least one graphical user interface client, least one graphical user interface that comprises:
      at least one media player area that is configured to display at least one media player, and
      a plurality of metadata areas that are configured to display, in real-time, a plurality of streamed metadata items that are related to at least a portion of content of at least one media presentation streamed by the at least one media player at a particular playing time to form a metadata stream;
   wherein the at least one graphical user interface client is configured to operationally connect to at least one dedicated application server;
   wherein the at least one dedicated application server comprises:
      a non-transitory memory storing instructions and
      at least one server processor;
      wherein, when executing the instructions by the at least one server processor, the at least one dedicated application server is configured to operationally connect to the at least one graphical user interface client;
      wherein the at least one dedicated application server is associated with at least one metadata item database, comprising metadata related to plurality of items;
   receiving, by the at least one graphical user interface client, from the user, a request to stream the at least one media presentation;
   streaming, by the at least one graphical user interface client, the at least one media presentation;
   for at least one portion of content of the at least one media presentation being streamed by the at least one media player at the particular playing time:
      determining, by the at least one graphical user interface client, the plurality of metadata items related to the at least one portion of the content of the at least one media presentation, based on at least one of:
         1) determining, separately from the streaming of the at least one portion of the at least one media presentation, at least one time coding flag being associated with the at least one portion of the content of the at least one media presentation and transmitting the at least one time coding flag to the at least one dedicated application server,
            wherein the at least one dedicated application server is configured to query the at least one metadata item database to identify a first plurality of metadata items related to at least one first item of the plurality of items and return the first plurality of metadata items to the at least one graphical user interface client; and
         2) causing the at least one portion of the content to be evaluated by a visual recognition algorithm;
            wherein the visual recognition algorithm is at least configured to:
               identify at least one media content item present in the at least one portion of the content of the at least one media presentation at the particular playing time,
               match the at least one media content item to at least one second item of the plurality of items whose metadata is stored in the at least one metadata item database, and
               return a second plurality of metadata items corresponding to the at least one second item to at least one graphical user interface client; and
      causing to display, at the plurality of metadata areas, the plurality of streamed metadata items so that each streamed metadata item progresses, during the particular playing time, from at least a first metadata area of the plurality of metadata areas to a second metadata area of the plurality of metadata areas based, at least in part, on a particular visual sequence;

wherein the particular visual sequence of the progression of each streamed metadata item progresses from the first metadata area of the plurality of metadata areas to the second metadata area of the plurality of metadata areas is independent from to the at least one portion of the content of the at least one media presentation;

wherein the plurality of streamed metadata items comprises one of:
  i) the first plurality of metadata items,
  ii) the second plurality of metadata items, and
  iii) any combination of at least one first metadata item of the first plurality of metadata items and at least one second metadata item of the second plurality of metadata items.

14. The method of claim 13, wherein at least one metadata area of the plurality of metadata areas is configured to be adjacent to the at least one media player area.

15. The method of claim 13, wherein at least one metadata area of the plurality of metadata areas is configured to overlay the at least one media player area.

16. The method of claim 13, wherein each item is one of a product, a service, or a combination of both.

17. The method of claim 13, wherein the at least one media content item is a representation of an individual.

18. The method of claim 13, wherein the at least one graphical user interface client is further configured to utilize the at least one processor of the computing device of the user to:
  utilize a media identifier of the at least one media presentation to electronically query the at least one dedicated application server to obtain a time coding sequence associated with the at least one media presentation,
  wherein the time coding sequence is a software entity that is distinct from the at least one media presentation, and
  separately playback the time coding sequence in parallel with the streaming of the at least one media presentation to determine the at least one time coding flag being associated with the at least one portion of the content of the at least one media presentation.

19. The method of claim 13, wherein the at least one graphical user interface client is further configured to synchronize the particular visual pattern of the metadata stream with the streaming of the at least one media presentation by the at least one media player.

20. The method of claim 13, wherein the visual recognition algorithm is configured to match the at least one media content item to the at least one second item of the plurality of items by utilizing at least one appearance-based algorithm.

21. The method of claim 20, wherein the at least one appearance-based algorithm is selected from the group consisting of: edge matching algorithm, divide-and-conquer search algorithm, grey scale matching algorithm, gradient matching algorithm, large model-bases algorithm, and any combination thereof.

22. The method of claim 13, wherein the visual recognition algorithm is configured to match the at least one media content item to the at least one second item of the plurality of items by:
  identifying at least one feature of the at least one media content item, and
  utilizing at least one feature-based algorithm to match, based on at least one feature of the at least one media content item, the at least one media content item to the at least one second item of the plurality of items whose metadata is stored in the at least one metadata item database.

23. The method of claim 22, wherein the at least one feature-based algorithm is selected from the group consisting of: interpretation trees algorithm, hypothesize and test algorithm, pose consistency and clustering algorithm, invariance algorithm, geometric hashing algorithm, scale-invariant feature transform (SIFT) algorithm, Speeded Up Robust Features (SURF) algorithm, and any combination thereof.

24. The method of claim 13, wherein the at least one media presentation is a live streaming.

* * * * *